(12) United States Patent
Sekiya et al.

(10) Patent No.: US 8,989,811 B2
(45) Date of Patent: *Mar. 24, 2015

(54) WIRELESS COMMUNICATION APPARATUS WITH PHYSICAL LAYER PROCESSING MODULE AND MAC LAYER PROCESSING MODULE AND ITS COMMUNICATION METHOD

(71) Applicant: Kabushiki Kaisha Toshiba, Minato-ku (JP)

(72) Inventors: Masahiro Sekiya, Inagi (JP); Daisuke Taki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 13/710,995

(22) Filed: Dec. 11, 2012

(65) Prior Publication Data

US 2013/0094492 A1 Apr. 18, 2013

Related U.S. Application Data

(63) Continuation of application No. 12/724,992, filed on Mar. 16, 2010, now Pat. No. 8,340,716.

(30) Foreign Application Priority Data

Jun. 24, 2009 (JP) ................................ 2009-150040

(51) Int. Cl.
*H04M 1/00* (2006.01)
*H04B 7/00* (2006.01)
*H04B 7/005* (2006.01)
*H04W 72/12* (2009.01)

(52) U.S. Cl.
CPC ........... *H04B 7/005* (2013.01); *H04W 72/1215* (2013.01)

USPC .................... 455/553.1; 455/41.2; 455/67.13; 370/336; 370/442

(58) Field of Classification Search
CPC ..... H04W 88/06; H04W 88/10; H04W 84/18; H04M 1/7253; H04B 1/401
USPC .............. 455/41.2, 63.1, 67.11, 67.13, 550.1, 455/552.1, 553.1; 370/321, 336, 442, 445
See application file for complete search history.

(56) References Cited

U.S. PATENT DOCUMENTS

| | | | |
|---|---|---|---|
| 7,280,801 B2 | 10/2007 | Dahl | |
| 7,324,486 B2 | 1/2008 | Noguchi et al. | |
| 8,005,504 B2 | 8/2011 | Sano et al. | |
| 8,019,281 B2 | 9/2011 | Yang et al. | |
| 2002/0142779 A1 | 10/2002 | Goto et al. | |
| 2006/0221926 A1 | 10/2006 | Maekawa et al. | |
| 2006/0246932 A1 | 11/2006 | Liang | |

FOREIGN PATENT DOCUMENTS

| | | |
|---|---|---|
| JP | 2004-363728 | 12/2004 |
| JP | 2005-045330 | 2/2005 |

*Primary Examiner* — Quochien B Vuong
(74) *Attorney, Agent, or Firm* — White & Case LLP

(57) ABSTRACT

A wireless communication apparatus includes a first module, a second module, an inhibit module, a calculation module, and a control module. The first module constitutes a first system. The first system transmits and receives first data to and from a first device. The second module constitutes a second system. The second system transmits and receives second data to and from a second device in each interval time-divided with determined transmission timing. The inhibit module generates inhibit periods for preventing the first module from communicating by use of the first data. The calculation module calculates an occupation time required for the transmission and reception of the first data. The control module compares the period between the inhibit periods adjacent to one another with the occupation time and, according to the comparison result, instructs the first device to stop or delay the transmission of the first data.

9 Claims, 10 Drawing Sheets

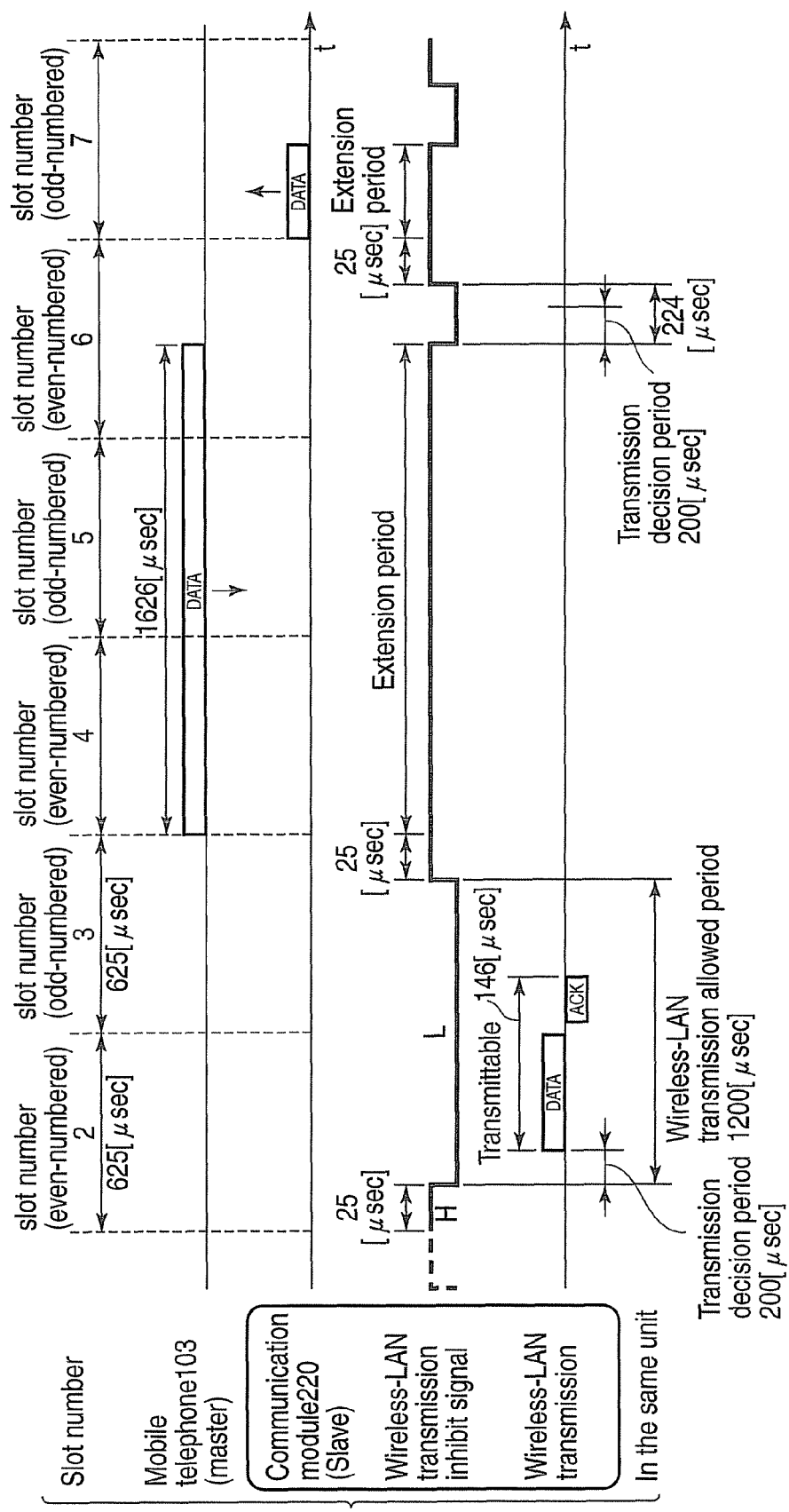
F I G. 8

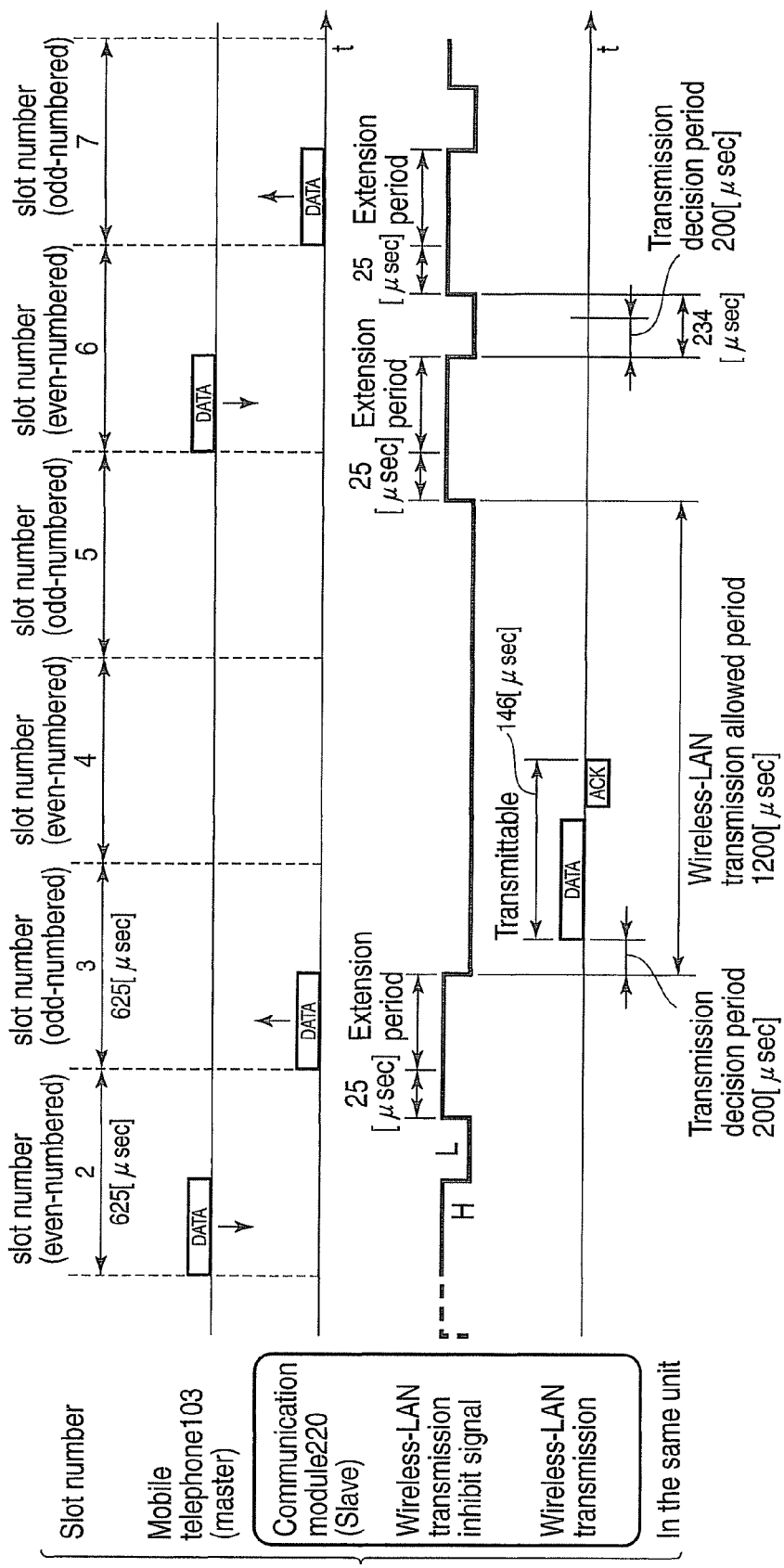
F I G. 9

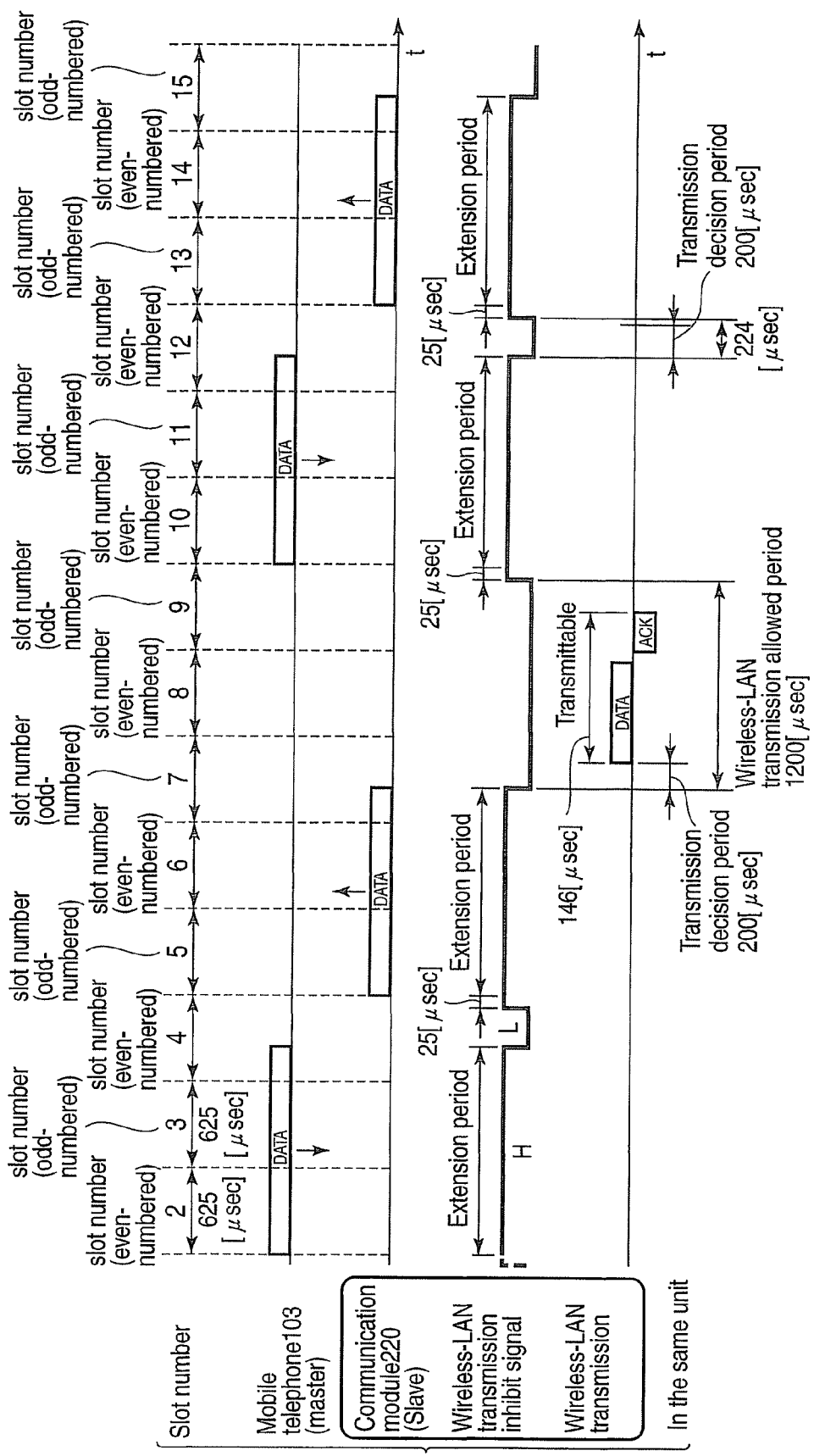
F I G. 10

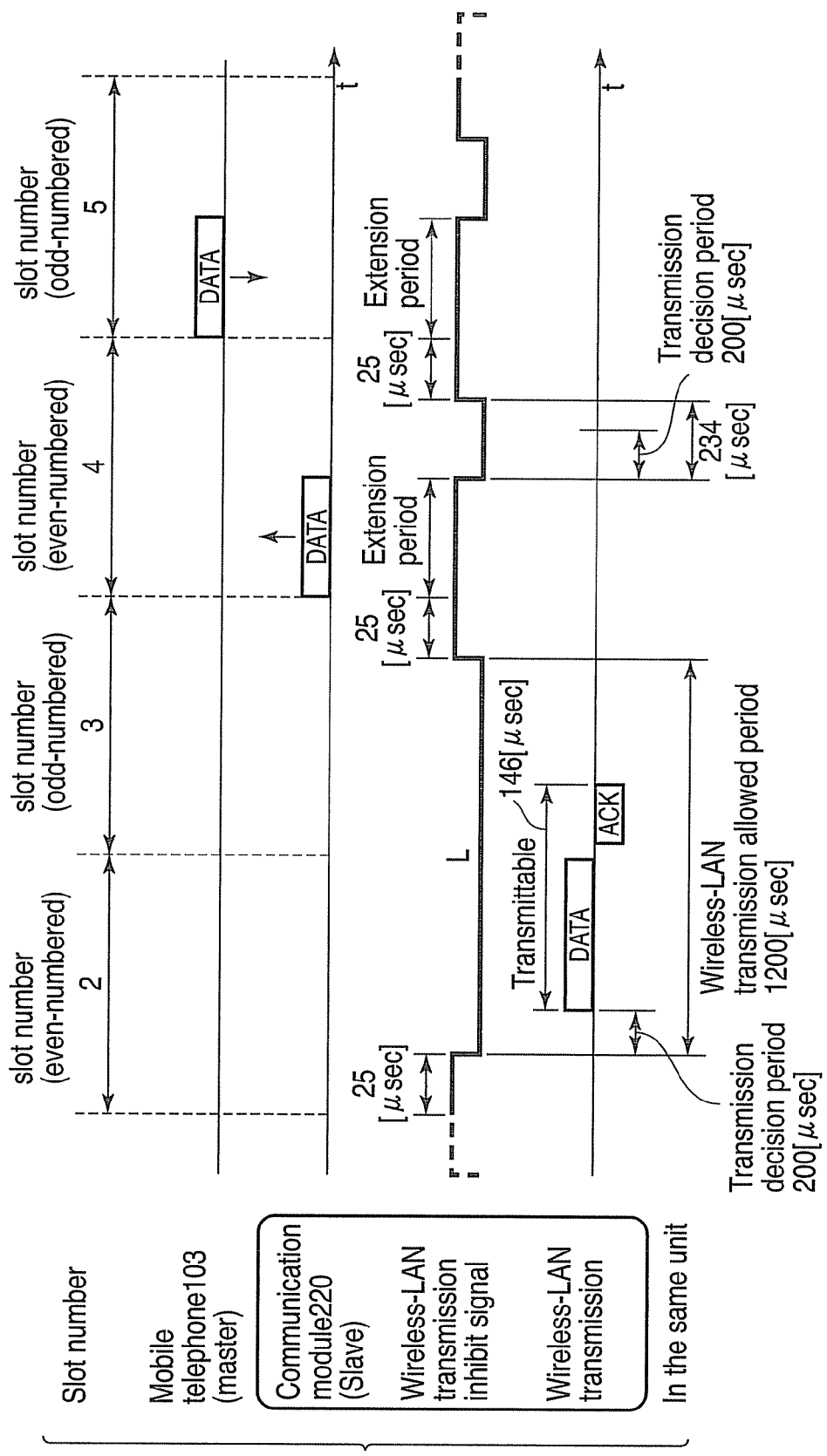
F I G. 11

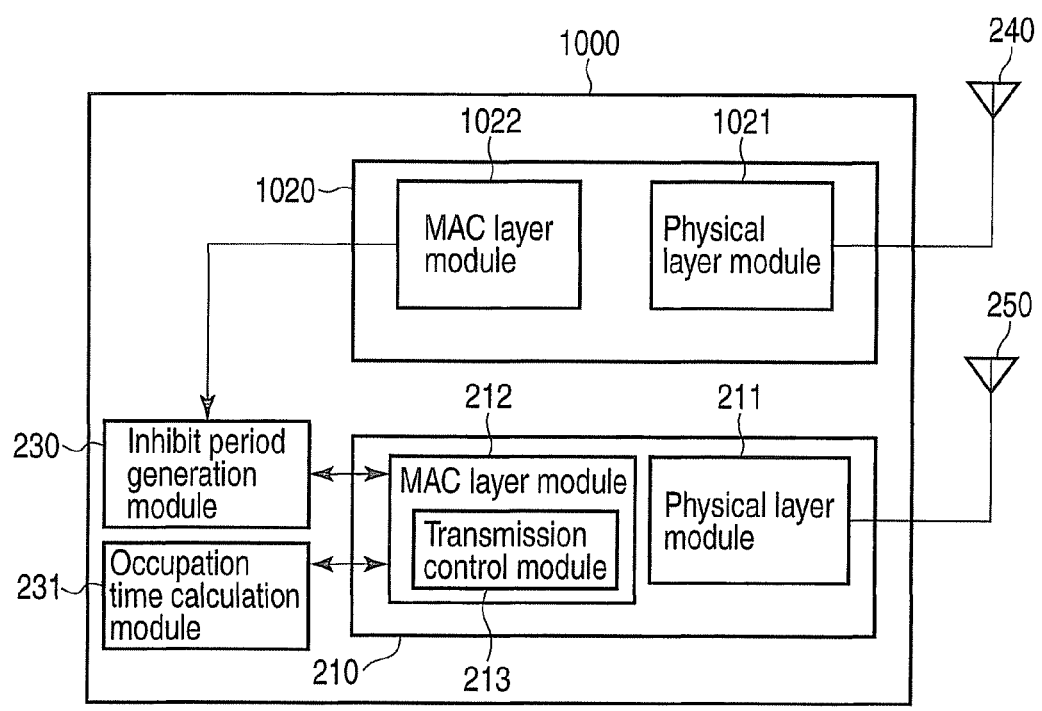
F I G. 12

WIRELESS COMMUNICATION APPARATUS WITH PHYSICAL LAYER PROCESSING MODULE AND MAC LAYER PROCESSING MODULE AND ITS COMMUNICATION METHOD

CROSS-REFERENCE TO RELATED APPLICATIONS

This application is a Continuation of application Ser. No. 12/724,992 filed Mar. 16, 2010, the entire contents of which is hereby incorporated by reference.

This application is based upon and claims the benefit of priority from prior Japanese Patent Application No. 2009-150040, filed Jun. 24, 2009, the entire contents of which are incorporated herein by reference.

BACKGROUND OF THE INVENTION

1. Field of the Invention

This invention relates to a wireless communication apparatus and its communication method.

2. Description of the Related Art

In recent years, electronic devices with a wireless communication function have been widely used. They include notebook-size personal computers (notebook PCs), game machines, car navigation systems, digital cameras, and personal digital assistants. Wireless LAN communication complying with the IEEE 802.11 standard and Bluetooth communication (registered trademark) are well known as wireless communication methods used in electronic devices with wireless communication functionality.

Wireless-LAN (IEEE 802.11b/g) and Bluetooth (IEEE 802.15.1) both use the 2.4-GHz frequency band. However, there is no interchangeability between the wireless methods (Wireless-LAN (IEEE 802.11b/g) and Bluetooth (IEEE 802.15.1)). Therefore, in an environment where wireless communication devices differing in communication method are close to one another, they communicate using the same frequency band in the same time period, which results in radio wave interference. This causes the problem of degrading the communication performance.

Specifically, the problem occurs when a plurality of devices which have the function of implementing different wireless communication methods are arranged closed to one another in the same device, such as a notebook PC or a personal digital assistant, or when they are installed in the same system LSI (Large-scale Integrated circuit).

As for a conventional method of alleviating the degradation of the communication performance, Jpn. Pat. Appln. KOKAI Publication No. 2004-363728 and Jpn. Pat. Appln. KOKAI Publication No. 2005-45330 have disclosed a method of, when IEEE 802.11b/g/n and Bluetooth (a registered trademark) mounted in the same device perform communication simultaneously, monitoring the communication state of each wireless function and, if one function is communicating, inhibiting the other from communicating.

BRIEF SUMMARY OF THE INVENTION

A wireless communication apparatus according to an aspect of the present invention includes;

a first wireless communication module which constitutes a first wireless communication system which transmits and receives first data to and from a first wireless device by a first communication method;

a second wireless communication module which constitutes a second wireless communication system which transmits and receives second data to and from a second wireless device in each interval time-divided with determined transmission timing by a second communication method differing from the first communication method;

an inhibit period generation module which generates inhibit periods for preventing the first wireless communication module from communicating by use of the first data, on the basis of information on the second communication method held in the second data and/or the transmission timing;

an occupation time calculation module which calculates an occupation time required for the transmission and reception of the first data; and a transmission control module which compares the period between the inhibit periods adjacent to one another with the occupation time and, according to the comparison result, instructs the first wireless communication module to stop or delay the transmission of the first data.

A wireless communication method of apparatus according to an aspect of the present invention includes;

causing a first wireless communication module to transmit and receive first data to and from a first wireless device by a first communication method;

causing a second wireless communication module to transmit and receive second data to and from the wireless communication apparatus in each interval time-divided with determined transmission timing by a second communication method differing from the first communication method;

causing a generation module to generate inhibit periods for preventing the first wireless communication module from communicating by use of the first data, on the basis of information on the second communication method held in the second data and/or the transmission timing;

causing the first wireless communication module to check whether the communication module transmits and receives the first data to and from the first wireless device;

causing a calculation module to calculate an occupation time required for the first data to be transmitted and received if the first data is transmitted and received;

causing a control module to calculate the period between the inhibit periods adjacent to one another; and causing the control module to compare the period with the occupation time and, according to the comparison result, instructs the first wireless communication module to stop or delay the transmission of the first data.

BRIEF DESCRIPTION OF THE SEVERAL VIEWS OF THE DRAWING

FIG. 8 is a time chart for a wireless communication system according to a second embodiment of the invention;

FIG. 9 is a time chart for a wireless communication system according to a third embodiment of the invention;

FIG. 10 is a time chart for a wireless communication system according to a modification of the third embodiment;

FIG. 11 is a time chart for a wireless communication system according to a fourth embodiment of the invention;

FIG. 12 is a block diagram of a wireless communication apparatus according to a fifth embodiment of the invention.

DETAILED DESCRIPTION OF THE INVENTION

Figure 1:
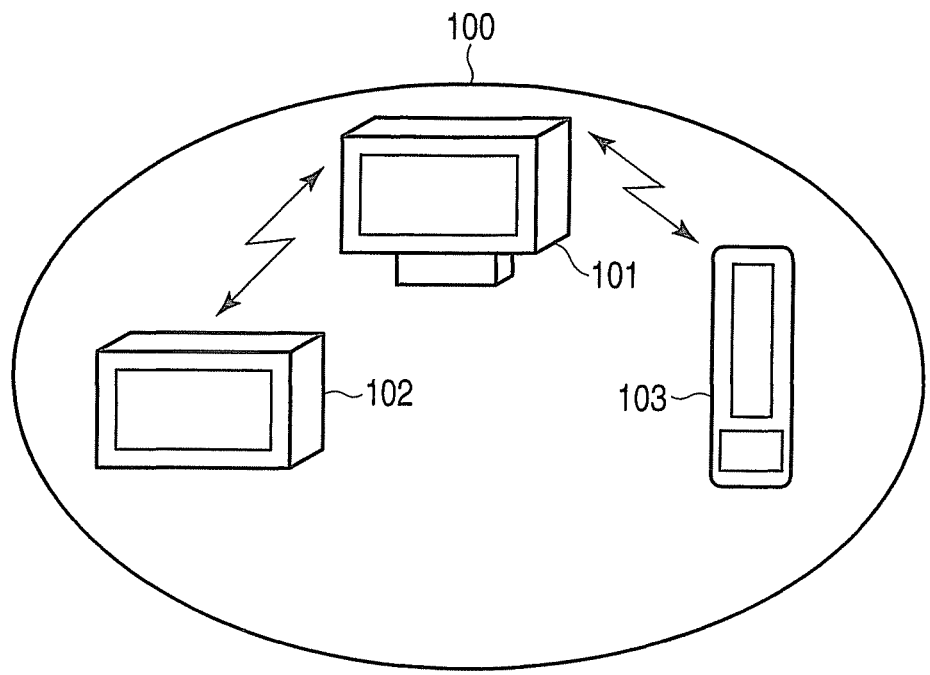
FIG. 1 is a concrete example of a wireless communication system according to a first embodiment of the invention.

Hereinafter, referring to the accompanying drawings, embodiments of the invention will be explained. Like parts are shown by corresponding reference numerals throughout all the drawings.

First Embodiment

A wireless communication apparatus and its communication method according to a first embodiment of the invention will be explained with reference to FIG. 1. FIG. 1 is a conceptual diagram of a wireless communication system according to the first embodiment. In the wireless communication system of the first embodiment, wireless communication complying with the IEEE 802.11 standard is performed.

Specifically, a unit equipped with a car navigation system (hereinafter, referred to as in-car unit 101) includes an IEEE 802.11 compatible wireless communication module which enables wireless communication complying with the IEEE 802.11(g/b/n) standard and a wireless communication module which enables wireless communication conforming to the Bluetooth (IEEE 802.15.1) standard.

An in-car display 102 includes an IEEE 802.11 compatible wireless communication module which enables wireless communication complying with the IEEE 801.11 standard.

A mobile telephone 103 includes a wireless communication module which enables wireless communication conforming to the Bluetooth standard.

The in-car unit 101 and in-car display 102 constitute a wireless LAN system conforming to the IEEE 802.11 standard. The in-car unit 101 and in-car display 102 can be connected to each other with a wireless LAN. The in-car unit 101 and mobile telephone 103 form a pico-net according to the Bluetooth standard. The in-car unit 101 and mobile telephone 103 can be connected to each other by Bluetooth.

In not only the first embodiment but also a second and a third embodiment of the invention explained later, the wireless communication module mounted on the in-car unit 101 and capable of Bluetooth communication functions as a slave and the mobile telephone functions as a master.

In the in-car unit 101, the IEEE 802.11 compatible wireless communication module and the communication module capable of Bluetooth communication function may be provided in the form of separate wireless communication modules. Alternatively, the in-car unit 101 may be equipped with a wireless communication module which includes an LSI having both the IEEE 802.11 compatible wireless LAN function and the Bluetooth communication function.

As described above, the in-car unit 101 of the first embodiment employs different wireless communication methods. Accordingly, the in-car unit 101 performs wireless LAN communication with the in-car display 102, while performing Bluetooth communication with the mobile telephone 103.

The in-car display 102 may be equipped with an IEEE 802.11 compatible wireless communication module. Alternatively, the in-car display 102 may be configured to allow the insertion of a card with an IEEE 802.11 compatible wireless communication function and enable wireless LAN communication with a wireless communication base station (in this case, in-car unit 101).

Similarly, the mobile telephone 103 may be equipped with a communication module which enables a Bluetooth communication function. Alternatively, the mobile telephone 103 may be configured to allow the insertion of a card with a wireless communication function capable of Bluetooth communication and enable Bluetooth communication with a slave (in this case, in-car unit 101).

<Frequency Channel>

Next, frequency bands used in wireless LAN communication and Bluetooth communication will be explained.

<Wireless LAN Communication>

In wireless LAN communication in the wireless communication system of the first embodiment, wireless communication is performed at frequencies in a 2.4-GHz band. Specifically, the range of 2400 MHz to 2483.5 MHz is used. Thirteen frequency channels are allocated to the frequency band. The frequency channels are arranged at intervals of 5 MHz. In wireless communication conforming to the IEEE 802.11b/g standard, an approx. 20-MHz band is used. In wireless communication complying with the IEEE 802.11n standard, either an approx. 20-MHz band or a 40-MHz band is used. It is when there is no jamming caused by a wireless communication system using the same frequency band around the wireless communication apparatus that performs wireless LAN communication that the 40-MHz band is mainly used.

<Bluetooth Communication>

In Bluetooth communication in the wireless communication system of the first embodiment, wireless communication is performed at frequencies in a 2.4-GHz band. Specifically, as in wireless LAN communication, a frequency band ranging from 2400 MHz to 2483.5 MHz is used. In Bluetooth communication, channels are set at intervals of 1 MHz in the frequency band, providing a total of 79 frequency channels. That is, communication is performed at any one of 2402 MHz, 2403 MHz, 2404 MHz, . . . , 2480 MHz.

Furthermore, in Bluetooth communication, a frequency hopping method (described later) is used. Specifically, of the 79 frequency channels, the frequency to be used is switched 1600 time per second on the basis of a specific hopping pattern. That is, the frequency is switched at intervals of 625 μsec, thereby performing Bluetooth communication. By doing this, the frequency channel used is occupied. The 625-μsec interval is referred to as one slot. In other words, a slot is an interval during which a specific frequency is kept until the present frequency has changed to the next frequency in the hopping process of the frequency used in a pico-net. The slot is expressed in time. A unit serving as a reference for the timing with which packets exchanged between a master and a slave are transmitted and received is known as a slot.

<Frame>

The formats of frames transmitted and received in wireless LAN communication and Bluetooth communication will be explained.

<Frame Format Used in Wireless LAN System>

Figure 2:
FIGS. 2 and 3 are data formats used in the wireless communication system according to the first embodiment.

Next, the format of a MAC frame constituting data exchanged between the in-car unit 101 and in-car display 102 in the wireless LAN system will be explained with reference to FIG. 2. FIG. 2 shows the format of a MAC frame created by a MAC layer module 212. The MAC frame includes a header part, a Frame Body part, and a FCS part.

In the MAC header part, information needed for a reception process in a MAC layer is set. Specifically, the information includes a value indicating the type of frame (e.g., a data frame used in transmitting user data, a management frame used in a Beacon frame or the like, or a control frame, such as an Ack frame), a direct destination, address fields in which the final destination and the MAC address of the source are set, the sequence number of data to be transmitted, and a Sequence Control field in which a fragment number when data is fragmented is set.

In the Frame Body part, information according to the type of frame (e.g., data to be transmitted and received) is set.

In the FCS part, a Cyclic Redundancy Code (CRC) is set. CRC is used to determine whether the data held in each of the MAC header part and Frame Body part has been received properly.

<Frame Format Used in Bluetooth Communication>

Figure 3:
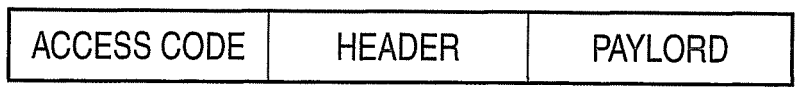

Next, the configuration of the format of a packet exchanged between the in-car unit 101 and mobile telephone 103 in Bluetooth communication will be explained with reference to FIG. 3. FIG. 3 shows an example of the format of a MAC frame created by a MAC layer module 222.

The data format roughly includes an access code, a packet header, and a payload.

The access code has a data length of 68 or 72 bits. On the basis of the access code transmitted from the in-car unit 101, the mobile telephone 103 recognizes the pico-net to which it belongs. Then, in the pico-net, the mobile telephone 103 can synchronize with the in-car unit 101 in communication. That is, the access code enables the in-car unit 101 and mobile telephone 103 in the pico-net to identify each other. When searching for the mobile telephone 103 (in an Inquiry process), the in-car unit 101 transmits data composed only of the access code. In data transmission using only the access code, the code has a data length of 68 bits. However, when a packet header is transmitted after the access code, the code has a data length of 72 bits.

The packet header has a data length of 54 bits. The packet header mainly performs communication control in the pico-net.

At the head of the packet header, AM_ADDR (not shown) is provided. AM_ADDR has a 3-bit value. AM_ADDR has addresses which enable up to 7 slaves to be recognized. That is, AM_ADDR has the following values: 001, 010, 011, . . . , 111. Since the value of AM_ADDR is composed of 3 bits, the number of slaves that can be accommodated in the pico-net is up to 7.

Behind AM_ADDR, control data is provided. The control data part includes information indicating the aforementioned ACL link method or an SCO link method, explained later.

The payload has a data length of 0 to 2745 bits. The payload includes net data actually exchanged between the in-car unit 101 and mobile telephone 103.

In the first embodiment, let transmitted and received Bluetooth packets be DM packets. A DM packet, which is a packet including a Forward Error Correction (FEC) code, is used in an Asynchronous Connection Oriented (ACL) link. Any one of a DM1, a DM3, and a DM5 packet can be selected as a DM packet according to the amount of information transmitted at a time. Here, the expression DM1<DM3<DM5 holds. Hereinafter, when a DM1 packet is used, it will simply be referred to as a DM packet. The ACL link, which is a Point to Multipoint link including a master and a plurality of slaves, is used for data transfer between the master and a slave. Even if packets couldn't be transmitted from the master or a slave during communication due to degradation of the transmission line conditions, a specific quality is assured by transmitting the packets again. If the transmission line situation is good, a DH packet without the FEC code may be used. As for DH packets, too, any one of a DH1, a DH3, and a DH5 packet can be selected as a DH packet according to the amount of information transmitted at a time. Here, the expression DH1<DH3<DH5 holds. Especially, in the Bluetooth communication standard (Version 2.0+Enhanced Data Rate (EDR)), the maximum amount of information can be transmitted in wireless communication using 3-DH5 packets. The time required to transmit the maximum amount of information using 3-DH5 packets is 2878 μsec. This is called the maximum transmission time. The maximum transmission time is the transmission time required from when an antenna 240 starts to transmit one packet until it completes the transmission. The transmission time means the maximum time calculated from the determined modulation method, the number of bytes in a packet, the header length, and the like in Bluetooth communication.

<Configuration of in-Car Unit 101>

Figure 4:
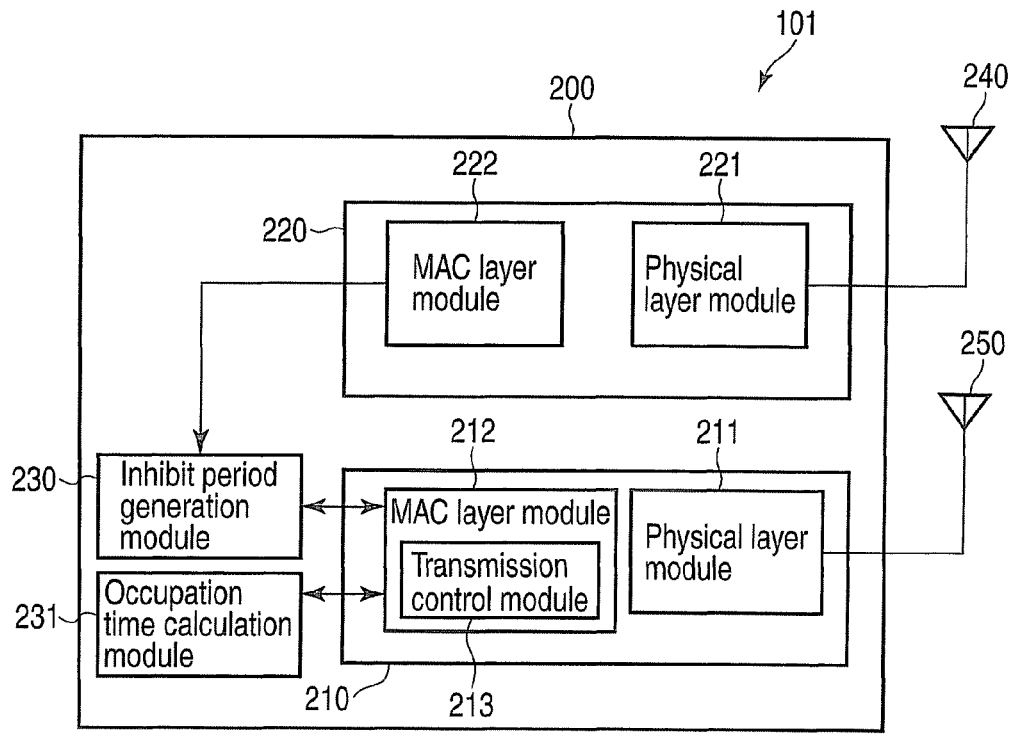
FIG. 4 is a block diagram of a wireless communication apparatus according to the first embodiment.

Next, the configuration of the in-car unit 101 (wireless communication apparatus 200) will be explained with reference to FIG. 4. FIG. 4 is a block diagram of the in-car unit 101 of the first embodiment. As shown in FIG. 4, the wireless communication apparatus 200 included in the in-car unit 101 comprises a Bluetooth communication module (hereinafter, referred to as communication module 220), an IEEE 802.11 compatible wireless communication module 210 (hereinafter, referred to as communication module 210), an inhibit period generation module 230 (hereinafter, referred to as generation module 230), an occupation time calculation module 231 (hereinafter, referred to as calculation module 231), an antenna 240, and antenna 250. The communication module 210 includes a physical layer module 211, a Medium Access Control (MAC) layer module 212, and a transmission control module 213. The communication module 220 includes a physical layer module 221 and a MAC layer module 222.

<Antenna 240 and Antenna 250>

The antenna 240 and antenna 250 will be explained. The antenna 240 and antenna 250 exchange signals in a high-frequency band used in performing communication on a wireless transmission path. The antenna 240 supplies the received wireless signal to the physical layer module 221. The antenna 250 supplies the received signal to the physical layer module 211. At the time of transmission, the antenna 240 outputs the wireless signal supplied from the physical layer module 221. At the time of transmission, the antenna 250 outputs the wireless signal supplied from the physical layer module 211.

<Communication Module 210>

Next, the communication module 210 will be explained. The communication module 210 performs wireless communication conforming to the IEEE 802.11 standard. Specifically, the physical layer module 211 and MAC layer module 212 perform wireless communication complying with the IEEE 802.11 standard.

<Physical Layer Module 211>

The physical layer module 211 includes a wireless module (RF (Radio Frequency) module) (not shown). Specifically, the physical layer module 211 down-converts a reception signal (analog signal) supplied from the antenna 250 and subjects the resulting reception signal to A/D (Analog to Digital) converter, thereby producing a digital signal. Then, the physical layer module 211 demodulates the digital signal. Specifically, the physical layer module 211 subjects the digital signal to, for example, Orthogonal Frequency Division Multiplexing (OFDM) demodulation and error-correction decoding, thereby obtaining a reception frame. Then, the physical layer module 211 outputs the obtained reception frame to the MAC layer module 212. The physical layer module 211 may perform demodulation using a Direct Sequence method typified by the spectrum diffusion method instead of OFDM demodulation. In transmitting data, the physical layer module 211 subjects the transmission data supplied from the MAC layer module 212 to a specific modulation process, up-converts the resulting data, and supplies the up-converted data to the antenna 250.

<MAC Layer Module 212>

Next, the MAC layer module 212 will be explained. The MAC layer module 212 includes a transmission control module 213.

The MAC layer module 212 performs specific access control complying with the IEEE 802.11 standard. Specifically, the MAC layer module 212 implements the CSMA/CA (Carrier Sense Multiple Access with Collision Avoidance) method. The CAMA/CA method determines whether to transmit a frame after monitoring the status of use of a wireless environment and further to check to see if there is any wireless communication apparatus which is performing wireless communication in the vicinity before transmitting the frame. If having determined that no wireless communication is being performed in its vicinity, the MAC layer module 212, having received permission of transmission from the transmission control module 213, transmits the frame to the physical layer module 211. Moreover, the MAC layer module 212 not only adds a MAC header to data to be transmitted but also transmits an acknowledgement (Ack) frame in response to the received frame.

The transmission control module 213 controls the timing of transmitting a frame created by the MAC layer module 212. The transmission control module 213 measures each of the Inter Frame Spacing (IFS) time and back off time. After the measured specific time has elapsed, the transmission control module 213 permits the MAC layer module 212 to transmit a frame. If having determined that wireless communication is in progress in its vicinity in the middle of measuring the total of the IFS time and the back off time or before the measurement, the transmission control module 213 interrupts the measurement again. Thereafter, if the MAC layer module 212 has determined that no wireless communication is being performed in its vicinity, the transmission control module 213 starts the measurement again.

The IFS time includes, for example, SIFS, PIFS, DIFS, and AIFS. An explanation will be given taking DIFS as an example.

DIFS is a value counted up during the period from when the signal power of frequency channels has dropped below a specific threshold value at which surrounding wireless communication systems cannot detect the signal power until it is determined that the surrounding wireless communication systems is in the idle state. That is, DIFS is the minimum time to wait for before transmitting a frame after it has been determined that the surrounding wireless communication systems are in the idle state.

Furthermore, on the basis of an occupation time calculated by a calculation module 231 and an inhibit period signal generated by the generation module 230, the transmission control module 213 determines whether frames in wireless LAN communication can be transmitted. Specifically, the transmission control module 213 compares the time required for the low ("L") level transmission inhibit period output from the generation module 230 to change to the high ("H") level one (hereinafter, referred to as the remaining period) with the occupation time from when the generation module transmits a frame until the module receives Ack in response to the frame. If the remaining period is longer, the transmission control module 213 permits the MAC layer module 212 to transmit a frame. If the remaining period is shorter than the frame, the transmission control module 213 inhibits the frame from being transmitted. A concrete communication method is to discard transmission frames, turn off the power supply of, for example, a wireless amplifier (not shown) included in the physical layer module 211, or decrease the gain of the wireless amplifier to zero, thereby inhibiting frames from being transmitted. Here, to discard transmission frames means to discard the frames from a memory (not shown) included in, for example, the MAC layer module 212. Before being supplied to the physical layer module 211, the frames are stored in the memory. Even if the remaining period is shorter than the frame, the frame can be transmitted without interfering with data transmission by the communication module 220 by shortening the transmission frame length. To sum up, the transmission control module 213 performs the above control so as not to interfere with data communication by the communication module 220.

The remaining period can be calculated when the transmission inhibit signal output from the generation module 230 and connection information on the communication module 220 are received. Connection information on the communication module 220 may be directly received from the communication module 220 or via the generation module 230.

<Communication Module 220>

Next, the communication module 220 will be explained. The communication module 220 performs Bluetooth communication conforming to the IEEE 802.15.1 standard. Specifically, the physical layer module 221 and MAC layer module 222 perform Bluetooth communication conforming to the IEEE 802.15.1 standard.

<Physical Layer Module 221>

The physical layer module 221 includes a wireless module (RF module) (not shown). Specifically, the physical layer module 221 down-converts a reception signal (Bluetooth packet) supplied from the antenna 240 and then divides the resulting reception signal into, for example, streaming data packets and nonstreaming data packets. Thereafter, the physical layer module 221 demodulates the digital signals. Specifically, the physical layer module 221 performs time-division multiplex communication, a frequency hopping spectrum spreading method as a typical spectrum spreading method, and error correction decoding, thereby obtaining reception frames. That is, as time passes, the physical layer module 221 causes the frequency used to hop, thereby obtaining reception frames. Then, the physical layer module 221 outputs the obtained reception frames to the MAC layer module 222. The physical layer module 221 may use OFDM. When data is transmitted, the physical layer module 221 subjects the transmission data supplied from the MAC layer module 222 to a specific modulation process, up-converts the modulated data, and supplies the resulting data to the antenna 240.

<MAC Layer Module 222>

The MAC layer module 222 performs specific access control complying with the Bluetooth communication standard. Specifically, the MAC layer module 22 performs connection processes (including, for example, an Inquiry process, an Inquiry Scan process, a Page process, and a Page Scan process) between the mobile telephone (master) 103 and in-car unit (slave) 101, establishes a pico-net (including the synchronization of the master and slaves), and controls the data transmission and reception after the establishment of the pico-net. In the first embodiment, the communication module 220 functioning as a communication module for Bluetooth communication acts as a slave. The MAC layer module 222 synchronizes the mobile telephone 103 with a time slot on the basis of the internal clock of the mobile telephone 103. That is, the MAC layer module 222 recognizes each of the timing (an odd-numbered slot) with which the module 222 transmits data and the timing (an even-numbered slot) with which the mobile telephone 103 transmits data. Then, the MAC layer module 222 outputs the recognized time slot number SN and connection information on the mobile telephone 103 to the generation module 230. Here, connection information is transmitted and received information is exchanged between the communication module 220 and mobile telephone 103. Specifically, connection information is information indicating that Bluetooth packets are being transmitted or received.

<Generation Module 230>

Next, the generation module 230 will be explained. The generation module 230 controls a transmission inhibit signal output to the communication module 210 on the basis of the time slot number SN supplied from the MAC layer module 222 and connection information on the communication module 220 and mobile telephone 103. In the first embodiment, the generation module 230 performs control as described in the following two items:

(1) The module 230 raises the transmission inhibit signal to a high ("H") level for a specific period with the timing of transmission from the mobile telephone 103 or in an even-numbered slot.

(2) The module 230 raises the transmission inhibit signal to a high level during a specific period from when the mobile telephone 103 receives data in an even-numbered slot until the in-car unit 101 responds to the data in an odd-numbered slot following the even-numbered slot.

The "H" level means the inhibition of transmission of data by the communication module 210. In the Bluetooth communication standard, an error of 10 μsec in the timing with which the master and a slave exchange data is allowed. That is, for example, the timing with which the mobile telephone 103 transmits data in an even-numbered slot is allowed to overlap with an odd-numbered slot by 10 μsec. The same holds true for the timing with which the in-car unit 101 transmits data. Accordingly, in the first embodiment, the transmission inhibit signal is made high ("H") during the period from 25 μsec before an odd-numbered slot changes to an even-numbered slot until 25 μsec after the odd-numbered slot has changed to the even-numbered slot. In addition, when the in-car unit 101 receives data from the mobile telephone 103 and responds to the data in an odd-numbered slot, the transmission inhibit signal is made high ("H") during the period from 25 μsec before an even-numbered slot changes to an odd-numbered slot until 25 μsec after the even-numbered slot has changed to the odd-numbered slot. During the period in which data is being transmitted or received in each of an even-numbered slot and an odd-numbered slot, the transmission inhibit signal is made high (including an extension period described later). The reason why the period in which the transmission inhibit signal is made high is set to 25 μsec before and after a slot is that an allowance is made for the 10 μsec.

<Calculation Module 231>

Next, the calculation module 231 will be explained. The calculation module 231 measures the time required for the communication module 210 to perform wireless communication with the in-car display 102. That is, the module 231 calculates the time required to transmit and receive data at a specific frequency. The MAC layer module 212 roughly generates two types of frames: one frame requires a response frame (Ack) from the in-car display 102 and the other frame does not require a response frame (Ack) from the in-car display 102. The calculation module 231 calculates the time required to communicate with the frame or the time required for the frame and the response frame (Ack) to communicated to each other.

Figure 5A:
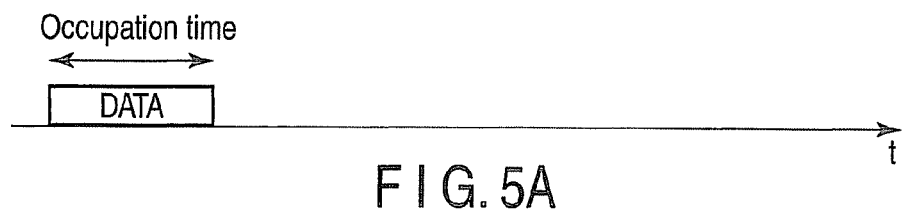
FIGS. 5A, 5B and 5C show an occupation period of data transmitted and received by the wireless communication system of the first embodiment.
Figure 5B:
Figure 5C:
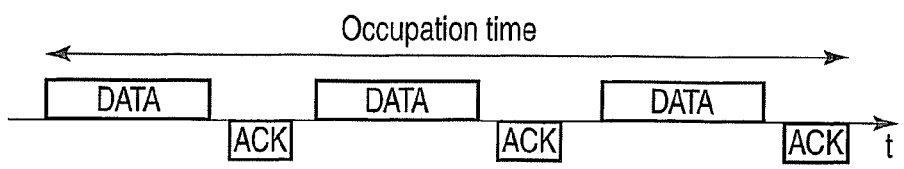

FIGS. 5A to 5C are conceptual diagrams of a frame created by the communication module 210 and a response frame (Ack) transmitted by the in-car display 102 in response to the frame.

FIG. 5A is a conceptual diagram of a frame accompanied by a no response frame created by the communication module 210. FIG. 5A shows an occupation time required for the frame created by the communication module 210 to be transmitted to the in-car display 102. The calculation module 231 calculates the length of the frame created by the calculation module 231 as an occupation time.

FIG. 5B is a conceptual diagram of a frame accompanied by a response frame (Ack) created by the communication module 210 as described above. FIG. 5B shows an occupation time required for the frame created by the communication module 210 and a response frame (Ack) corresponding to the frame to be transmitted and received. The calculation module 231 calculates as an occupation time the time from when the frame created by the communication module 210 is transmitted to the in-car display 102 until a response frame (Ack) has been received from the in-car display 102.

FIG. 5C shows a case where a frame and a response frame (Ack) corresponding to the frame in FIG. 5B are transmitted and received in a burst manner three times. In this case, the calculation module 231 regards the time from when a first frame created by the communication module 210 is transmitted until the module 231 receives a response frame (Ack) corresponding to a third frame as an occupation time.

Next, a formula for calculating an occupation time $TX_{TIME}$ by the calculation module 231 will be explained. The occupation time $TX_{TIME}$ is expressed by equation (1). The calculation formula computes the time required for either a frame or a response frame (Ack) to reach the reception side. That is, in the case of FIG. 5B, the time has to be calculated for each of a frame and a response frame (Ack) corresponding to the frame by equation (1):

$$TX_{TIME} = T\_Pre\text{-}sig + T\_sym * Ceiling((22 + 8*LENGTH)/(4*RATE)) + T\_ext \quad (1)$$

where T_Pre-sig is the total value of a Preamble and a Signal field added by the physical layer 211 at the time of transmission (in μsec), T_sym is the length of one OFDM symbol (in μsec), Ceiling function (a roundup function, that is, in the case of Ceiling (A) (A is a real number), the function rounds up A to the nearest integer), LENGTH is a transmission data length (in bytes), RATE is the transmission rate of PHY (Mbit/s), T_ext is the length of a Signal Extension field (in μsec), and 22 is the number of bits in Service bits and Tail bits added when a PHY layer performs the aforementioned modulation.

<Flowchart for Wireless Communication System>

Figure 6:
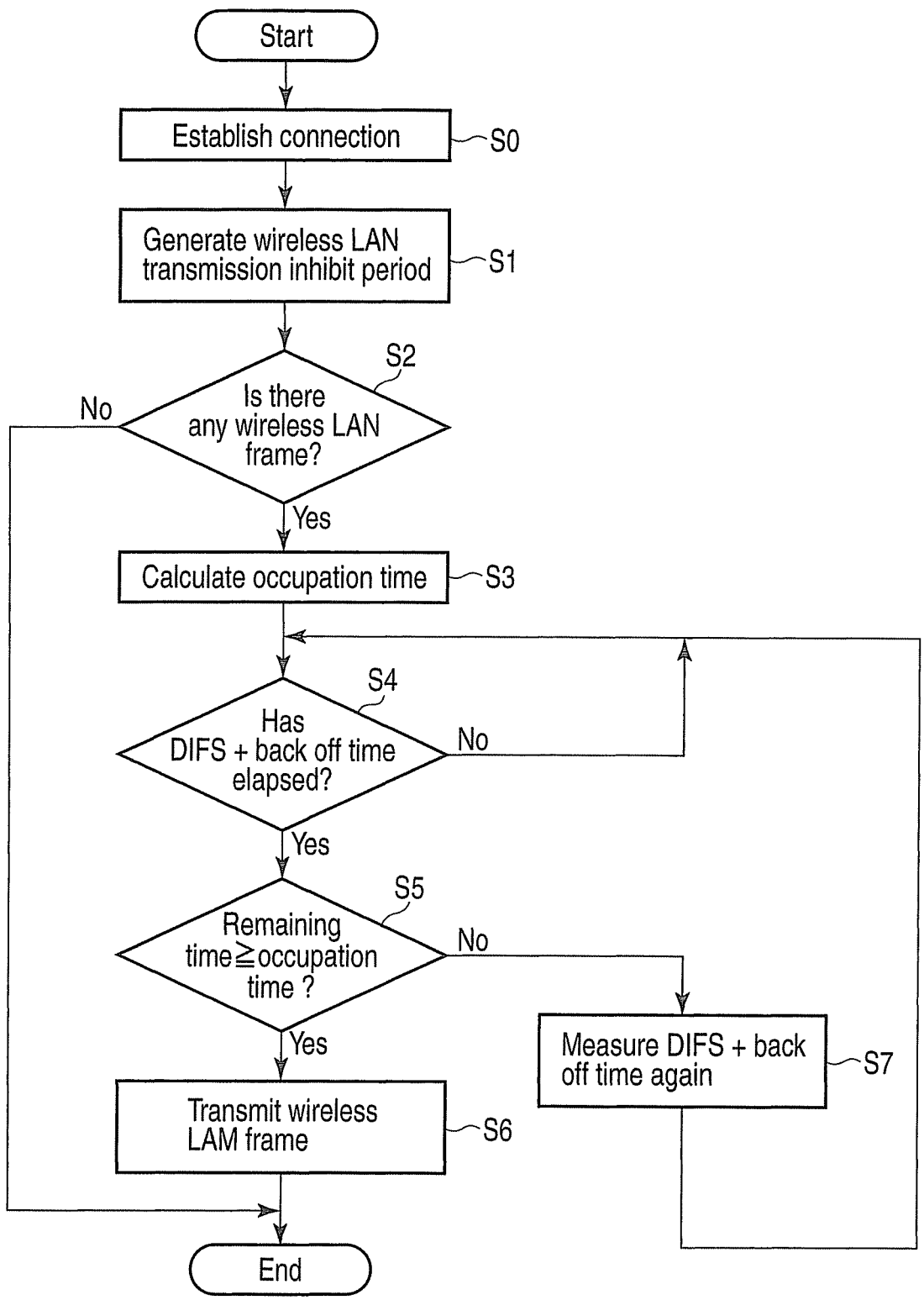
FIGS. 6 and 7 are flowcharts to explain the wireless communication system of the first embodiment.

Next, a communication method used in the wireless communication system configured as described above will be explained with reference to FIG. 6. FIG. 6 is a flowchart to explain wireless LAN communication and Bluetooth communication performed by the in-car unit 101.

First, the communication module 220 functioning as a slave carries out a specific connection process with the mobile telephone 103. By doing this, the communication module 220 is caused to synchronize with the mobile telephone 103, thereby establishing connection (step S0). That is, the communication module 220 obtains a slot number SN. The connection process includes, for example, an Inquiry process, an Inquiry Scan process, a Page process, and a Page Scan process. Thereafter, the MAC layer module 222 outputs a slot synchronizing signal (slot number SN) and connection information on the communication module 220 to the generation module 230.

Then, the generation module 230 generates a transmission inhibit signal to the communication module 210 on the basis of the slot synchronizing signal and connection information received from the MAC layer module 222 in step S0 (S1).

Next, the MAC layer module 212 checks whether there is any frame to be transmitted from the antenna 250 (S2). In step S2, if there is a frame to be transmitted (YES in step S2), the calculation module 231 calculates an occupation time for the frame (S3). Specifically, the calculation module 231 calculates an occupation time on the basis of whether to request the PHY transmission rate, frame length, and response frame (Ack) attached to the frame or whether to perform burst transmission at SIFS intervals. Next, the transmission control module 213 checks whether DIFS+back off time have elapsed (S4). In step S4, if DIFS+back off time have elapsed, the transmission control module 213 calculates the remaining time from after DIFS+back off time have elapsed until the inhibit period signal generated by the generation module 230 is made high. Then, the transmission control module 213 compares the occupation time required to transmit the frame received from the calculation module 231 with the remaining period (S5).

In step S5, if the occupation time is not longer than the remaining time (YES in step S5), the frame created by the MAC layer module 212 is transmitted from the antenna 240 to the in-car display 102 (S6). In step S5, if the occupation time is longer than the remaining time (NO in step S5), the transmission control unit 213 does not transmit the frame created by the MAC layer module 212, measures DIFS+back off time again (S7), and returns to step S4.

In step S4, if DIFS+back off time have not elapsed (NO in step S4), the transmission control module 213 waits until the time has elapsed.

If in step S2 there is no frame to be transmitted in the MAC layer module 212, the transmission control module 213 does not control the communication module 210.

<Data Transmission and Reception by Wireless Communication System (Part 1)>

Figure 7:
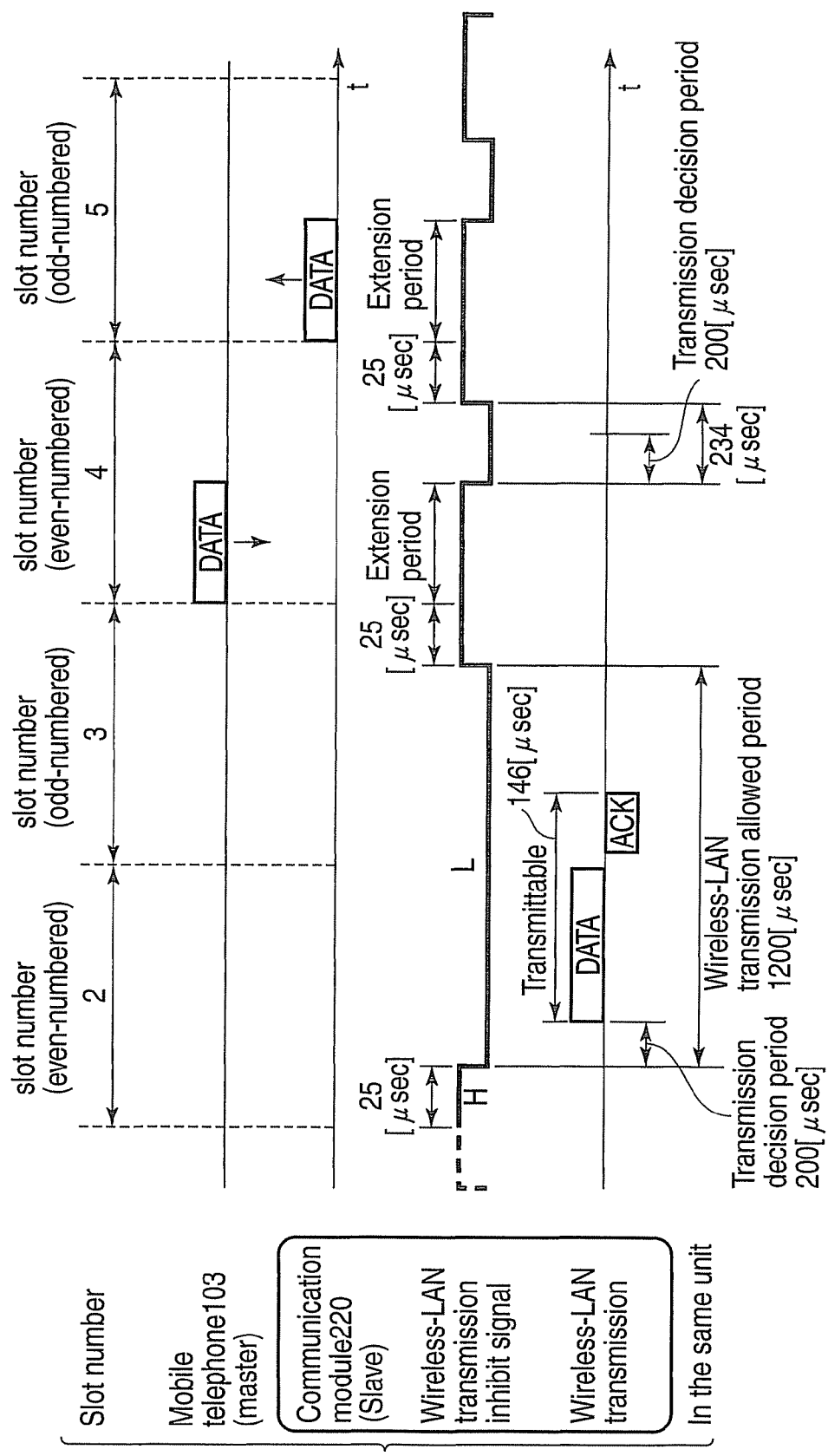

Next, the operation of transmitting and receiving data in the wireless communication system of the first embodiment will be explained with reference to FIG. 7. FIG. 7 depicts time charts to illustrate wireless LAN communication between the in-car unit 101 and in-car display 102 and Bluetooth communication between the in-car unit 101 and mobile telephone 103. Time is plotted along the horizontal axis. Slot number SN, Bluetooth packet transmission from the mobile telephone 103, Bluetooth packet transmission from the communication module 220, transmission inhibit signal, and data (data frame, Ack) exchanged between the communication module 210 and in-car display 102 in wireless LAN communication are enumerated vertically. Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. For the sake of convenience, suppose slot number SN starts with 2 and a pico-net is formed before slot number SN=0 (not shown).

<Before Slot Number SN=0>

First, the in-car unit 101 and mobile telephone 103 are synchronized with each other by a specific connection method and obtain each other's approval. By doing this, a pico-net is formed between the in-car unit 101 and mobile telephone 103 (S0). This enables the MAC layer module 222 to synchronize the mobile telephone 103 with a time slot.

<Slot Numbers SN=2 to SN=3>

After a pico-net is formed, the generation module 230 makes a transmission inhibit signal high during the period from when slot number SN changes from an odd number to an even number until 25 μsec after the odd number has changed to the even number, on the basis of the slot synchronizing signal received from the MAC layer module 222 (S1, 25 μsec from the starting point of slot SN=2). Thereafter, the generation module 230 makes the transmission inhibit signal low ("L") 25 μsec after the odd-numbered slot has changed to an even-numbered one.

Here, suppose the communication module 210 has a frame to be transmitted (YES in step S2). Then, using equation (1), the calculation module 231 calculates an occupation time required to transmit and receive a frame to be transmitted to the in-car display 102 and a response frame (Ack) corresponding to the frame (S3). As a result, in the first embodiment, the occupation time required for a frame to be transmitted is 102 μsec and the occupation time required for the response frame (Ack) to be received is 34 μsec. Adding an SIFS time of 10 μsec to the occupation times gives a total of 146 μsec.

Then, the transmission control module 213 compares the remaining period left until the transmission inhibit signal is made high with the occupation time. Here, the generation module 230 confirms that a Bluetooth packet is not transmitted from the mobile telephone 103 with the timing of slot number SN=2. This allows the generation module 230 to cause the transmission inhibit signal to remain low with the timing of slot number SN=2. As a result, since 146 1200 μsec (YES in step S5), the transmission control module 213 gives an instruction to transmit a frame (S6). Here, 1200 μsec is obtained as follows: since 2 slots (=625*2 slots)=1250 μsec and since there is a transmission inhibit signal made high for 25 μsec in each of the slots (25*2=50 μsec), this gives a remaining period of 1250−50=1200 μsec. It has been assumed that the time required from when the occupation time and remaining period are calculated until they are compared with each other (in FIG. 7, the transmission decision period) is, for example, 200 μsec.

<Slot Numbers SN=4 to SN=5>

Next, when the slot number has changed to slot number SN=4, the mobile telephone 103 transmits a Bluetooth packet to the communication module 220. Accordingly, on the basis of the slot synchronizing signal and connection information received from the MAC layer module 222, the generation module 230 makes the transmission inhibit signal high during the period from when slot number SN=3 has changed to slot number SN=4 until the mobile telephone 103 has completed the transfer of a Bluetooth packet (S1, in FIG. 7, an extension period in slot SN=4).

Thereafter, suppose the communication module 220 has a frame to be transmitted (YES in step S2). Then, using equation (1), the calculation module 231 calculates an occupation time required to transmit and receive a frame to be transmitted to the in-car display 102 and a response frame (Ack) corresponding to the frame (S3). As a result, the total of the occupation times for the frame, response frame, and SIFS is 146 μsec.

Next, the transmission control module 213 compares the remaining period left until the transmission inhibit signal is made high with the occupation time. Since the mobile telephone 103 has transmitted a Bluetooth packet in slot number SN=4, the generation module 230 predicts that the communication module 220 will transmit a Bluetooth packet in slot number SN=5. Accordingly, the generation module 230 makes the transmission inhibit signal high 25 μsec before the slot number changes to slot number SN=5.

Then, the calculation module 231 calculates the interval during which the transmission inhibit signal is made low in slot number SN=4. As a result, the interval in which the transmission inhibit signal is made low is 234 μsec. The period (transmission decision period) during which it is determined whether a frame created by the communication module 210 should be transmitted is set to 200 μsec. Accordingly, since 146≥34 μsec (NO in step S5), the transmission control module 213 does not transmit the frame created by the MAC layer module 212, measures DIFS+back off time again (S7), and returns to step S4.

Thereafter, when the slot number has changed to slot number SN=5, the communication module 220 transmits a Bluetooth packet to the mobile telephone 103. Therefore, the generation module 230 makes the transmission inhibit signal high during the period until the Bluetooth packet is transmitted in slot number SN=5. Then, the generation module 230 makes the transmission inhibit signal high 25 μsec before the slot number changes to slot number SN=6 (not shown). If the period in which the transmission inhibit signal made low in slot number SN=4 is short, the generation module 230 may not change the transmission inhibit signal from high to low in slot number SN=4 and cause the transmission inhibit signal to remain high until the data transfer from the communication module 220 in slot number SN=5 has been completed. The same holds true for FIGS. 8 to 11 and FIG. 13 explained below.

Effects of the First Embodiment

The wireless communication apparatus and its communication method produce the effects described below.

(1) The degradation of Bluetooth communication can be suppressed.

With the wireless communication apparatus and its commutation method of the first embodiment, even when the communication module 220 functions as a slave, wireless LAN communication between the communication module 210 and in-car display 102 can be stopped in the middle of Bluetooth communication between the communication module 220 and mobile telephone 103. This prevents the communication module 220 from erroneously receiving the data transmitted by the communication module 210 when the module 220 attempts to receive a Bluetooth packet. That is, in Bluetooth communication, the degradation of communication can be suppressed. Hereinafter, a conventional wireless communication apparatus will be explained.

With a conventional wireless communication apparatus, in Bluetooth communication between the master and a slave mounted in the same LSI or the same unit as a communication module (communication module 210) performing wireless LAN communication, the module performing the wireless LAN communication couldn't recognize the reception timing of a Bluetooth packet transmitted from the master. Accordingly, even when the slave was supposed to receive a Bluetooth packet, the module performed wireless LAN communication and caused the problem of erroneously receiving data transmitted and received in the wireless LAN communication.

The problem becomes significant when a Bluetooth communication module and a wireless LAN communication module are mounted on the same LSI as shown in FIG. 1 or when they are mounted in the same unit of a notebook PC or a personal digital assistant. The problem becomes particularly significant when a Bluetooth communication module functions as a slave and a wireless LAN communication module has transmitted a frame. That is, in this case, since the slave receives erroneous data, the reception S/N ratio (Signal to Noise ratio) of the Bluetooth communication packets transmitted from the master is degraded.

With the wireless communication apparatus and its communication method according to the first embodiment, however, the generation module 230 and calculation module 231 are provided and the MAC layer module 222 has the function of outputting a slot synchronizing signal and connection information on Bluetooth communication to the generation module 230. Specifically, with the wireless communication apparatus and its communication method according to the first embodiment, the generation module 230 recognizes slot number SN on the basis of the slot synchronizing signal received from the MAC layer module 222. That is, the generation module 230 can recognize the timing with which an odd-numbered slot switches to an even-numbered slot. Accordingly, the generation module 230 can recognize the timing with which the mobile telephone 103 transmits a Bluetooth packet, regardless of whether or not a Bluetooth packet is transmitted. This enables the generation module 230 to make the transmission inhibit signal high 25 μsec before and after an odd-numbered slot switches to an even-numbered slot.

The same holds true for the reverse case. Specifically, the generation module 230 can recognize the timing with which an even-numbered slot switches to an odd-numbered slot. Then, when there is a Bluetooth packet from the mobile telephone 103 in an even-numbered slot, it is predicted that the communication module 220 will transmit a Bluetooth packet.

Accordingly, the generation module 230 can make the transmission inhibit signal high 25 μsec before and after an even-numbered slot switches to an odd-numbered slot.

Furthermore, the generation module 230 can actually recognize the transmission and reception of a Bluetooth packet in each slot on the basis of connection information on Bluetooth communication received from the MAC layer module 222. As a result, besides the transmission inhibit signal made high 25 μsec before and after the boundary between slots, an extension period as explained in FIG. 7 can be added as needed.

Then, the generation module 230 outputs the transmission inhibit signal to the MAC layer module 212. The communication module 220 then outputs connection information to the MAC layer module 212. The calculation module 231 outputs the occupation time to the MAC layer module 212. Therefore, the transmission control module 213 can compare the occupation time with the remaining time and avoid performing wireless LAN communication (or the transmission of a frame by the communication module 210) when receiving a Bluetooth packet from the mobile telephone 103. In other words, even when asynchronous packets are being transmitted and received by the ACL link method in the pico-net, use of the aforementioned configuration and its functions enables wireless LAN communication to be performed without interfering with Bluetooth communication.

As described above, the first embodiment can suppress the degradation of the communication performance of Bluetooth communication.

Second Embodiment

Next, a second embodiment of the invention will be explained. The second embodiment is such that Bluetooth packets transmitted and received in the first embodiment in a pico-net are DM3 packets. Since the configuration of a wireless communication apparatus 200 of the second embodiment and the function of the configuration are the same as those of the first embodiment, an explanation of them will be omitted. As in the first embodiment, the communication module 220 functions as a slave to the mobile telephone 103.

<Data Transmission and Reception in Wireless Communication System (Part 2)>

The operation of transmitting and receiving data in the wireless communication system of the second embodiment will be explained with reference to FIG. 8. FIG. 8 depicts time charts to illustrate wireless LAN communication between the in-car unit 101 and in-car display 102 and Bluetooth communication between the in-car unit 101 and mobile telephone 103. Time is plotted along the horizontal axis. Slot number SN, Bluetooth packet transmission from the mobile telephone 103, Bluetooth packet transmission from the communication module 220, transmission inhibit signal, and data (data frame, Ack) exchanged between the communication module 210 and in-car display 102 in wireless LAN communication are enumerated vertically. Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. For the sake of convenience, suppose slot number SN starts with 2 and a pico-net will be formed before slot number SN=0 (not shown). An explanation of the same operation as in the first embodiment will be omitted.

<Slot Numbers SN 4 to SN6>

The mobile telephone 103 transmits a Bluetooth packet to the communication module 220 with the timing of slot number SN=4. As described above, in the second embodiment, the mobile telephone 103 transmits DM3 packets. Therefore, the mobile telephone 103 transmits DM3 packets at the same fixed frequency in the period of slot numbers SN=4 to SN=6.

Accordingly, on the basis of the slot synchronizing signal and connection information received from the MAC layer module 222, the generation module 230 makes the transmission inhibit signal high during the period from when the slot number is changed from slot number SN=3 to slot number SN=4 until the transfer of Bluetooth packets from the mobile telephone 103 is completed (S1, in FIG. 8, the extension period shown by slots SN=4 to SN=6).

Thereafter, suppose the communication module 210 has a frame to be transmitted (YES in step S2). Then, using equation (1), the calculation module 231 calculates an occupation time required to transmit and receive a frame to be transmitted to the in-car display 102 and a response frame (Ack) corresponding to the frame (S3). As a result, the total of the occupation times for the frame, response frame, and SIFS is 146 μsec.

Next, the transmission control module 213 compares the remaining period left until the transmission inhibit signal is made high with the occupation time. Here, the transmission control module 213 predicts that the communication module 220 will transmit a Bluetooth packet with the timing of slot number SN=7 in response to the Bluetooth packet transmitted by the mobile telephone 103 in the period of slot numbers SN=4 to SN=6. Accordingly, the generation module 230 makes the transmission inhibit signal high 25 μsec before the slot number changes to slot number SN=7. Then, the calculation module 231 calculates the interval during which the transmission inhibit signal is made low in slot number SN=6. As a result, the interval in which the transmission inhibit signal is made low is 224 μsec. The period (transmission decision period) during which it is determined whether the frame created by the communication module 210 should be transmitted is set to 200 μsec. Accordingly, since 146≥24 μsec (NO in step S5), the transmission control module 213 does not transmit the frame created by the MAC layer module 212, measures DIFS+back off time again (S7), and returns to step S4 (S4).

Thereafter, when the slot number has changed to slot number SN=7, the communication module 220 transmits a Bluetooth packet to the mobile telephone 103. Therefore, the generation module 230 makes the transmission inhibit signal high during the period until the Bluetooth packet is transmitted in slot number SN=7. Then, the generation module 230 makes the transmission inhibit signal high 25 μsec before the slot number changes to slot number SN=8 (not shown).

Effect of the Second Embodiment

The wireless communication apparatus and its communication method according to the second embodiment can also produce the same effect as described in item (1). Specifically, since the wireless communication apparatus of the second embodiment is the same as that of the first embodiment in configuration and function, even when packets transmitted and received in the pico-net are changed from DM1 to DM3, the same effect can be obtained. That is, the communication module 210 can perform wireless LAN communication, while suppressing the degradation of the communication performance of Bluetooth communication.

Third Embodiment

Next, a wireless communication apparatus and its communication method according to a third embodiment of the invention will be explained. The third embodiment is such that a communication module 220 and a mobile telephone 103 in a pico-net are connected to each other with a Synchronous Connection Oriented (SCO) link. In Bluetooth communication in the pico-net, HV2 packets are used. The HV2 packets are transmitted and received at intervals of 3 slots. That is, the transmission and reception of HV2 packets between the communication module 220 and the mobile telephone 103 are performed at intervals of 1.25 msec (625 μsec*2). In other words, each of the mobile telephone 103 and communication module 220 transmits HV2 packets at intervals of 4 slots. The SCO link, which is a Point to Point link between a master and a specific slave, is used in telephone quality sound symmetric 64-Kbps communication. Even if a packet cannot be transmitted in the middle of communication due to degradation of the transmission line conditions in voice call using the SCO link, the same packet will not be transmitted again. Since the configuration of the wireless communication apparatus 200 of the third embodiment and the function of the configuration are the same as those of the first embodiment, an explanation of them will be omitted. In addition, as in the first embodiment, the communication module 220 functions as a slave to the mobile telephone 103.

<Data Transmission and Reception in Wireless Communication System (Part 3)>

The operation of transmitting and receiving data in the wireless communication system of the third embodiment will be explained with reference to FIG. 9. FIG. 9 depicts time charts to illustrate wireless LAN communication between the in-car unit 101 and in-car display 102 and Bluetooth communication between the in-car unit 101 and mobile telephone 103. Time is plotted along the horizontal axis. Slot number SN, Bluetooth packet transmission from the mobile telephone 103, Bluetooth packet transmission from the communication module 220, transmission inhibit signal, and data (data frame, Ack) exchanged between the communication module 210 and in-car display 102 in wireless LAN communication are enumerated vertically. Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. For the sake of convenience, suppose slot number SN starts with 2 and a pico-net is formed before slot number SN=0 (not shown). An explanation of the same operations as in the first and second embodiments will be omitted.

<Slot Numbers SN2 to SN5>

After a pico-net has been formed, when the slot number has changed to slot number SN=2, the mobile telephone 103 transmits a Bluetooth packet to the communication module 220. Accordingly, the generation module 230 receives from the MAC layer module 222 the slot synchronizing signal, connection information, link method (in this case, SCO link) information, and Bluetooth packet (in this case, HV2 packet) information. For these pieces of information, the generation module 230 makes the transmission inhibit signal high during the period from when slot number SN=1 (not shown) changes to slot number SN=2 until the transfer of a Bluetooth packet from the mobile telephone 103 is completed (S1, in FIG. 9, the extension period in slot SN=2).

Since the mobile telephone 103 has transmitted a Bluetooth packet in slot number SN=2, the generation module 230 predicts that the communication module 220 will transmit a Bluetooth packet in slot number SN=3. From this, the generation module 230 makes the transmission inhibit signal high 25 μsec before the slot number changes to slot number SN=3. Thereafter, when the slot number has changed to slot number SN=3, the communication module 220 transmits a Bluetooth packet to the mobile telephone 103.

Accordingly, the generation module 230 makes the transmission inhibit signal low during the period until the transmission of the Bluetooth packet is completed in slot number SN=3. Thereafter, when the communication module 220 has transmitted the Bluetooth packet, the generation module 230 makes the transmission inhibit signal low.

Since the MAC layer module 222 has informed the generation module 230 of connection by the SCO link, the module 230 causes the transmission inhibit signal to remain low during the period of slot numbers SN=4 and SN=5. Here, suppose the communication module 210 has a frame to be transmitted (YES in step S2).

Then, using equation (1), the calculation module 231 calculates an occupation time required to transmit and receive a frame to be transmitted to the in-car display 102 and a response frame (Ack) corresponding to the frame (S3). As a result, in the third embodiment, the occupation time required to transmit a frame is 102 μsec and the occupation time required to receive the response frame is 34 μsec. Adding the SIFS time (10 μsec) to the occupation times gives a total of 146 μsec.

Then, the transmission control module 213 compares the remaining time left until the transmission inhibit signal is made high with the occupation time. Since the comparison result has shown that 146≥1484 μsec (YES in step S5), the transmission control module 213 gives an instruction to transmit a frame (S6).

Here, 1484 μsec is obtained as follows: since 3 slots (=625*3 slots, slot numbers SN=3 to SN=5)=1875 μsec and since the transmission inhibit signal made high in slot number SN=5 lasts for 25 μsec and the time required to transmit a frame in slot number SN=3 is 366 μsec, the remaining period is 1875−(25+366)=1484 μsec. It is assumed that the time from when the occupation time and remaining time are calculated until they are compared (in FIG. 9, the transmission decision period) is, for example, 200 μsec.

Thereafter, in slot numbers SN=6 and SN=7, HV2 packets are transmitted and received. Since the operation of the configuration of the wireless communication apparatus 200 in slot numbers SN=6 and SN=7 is the same as in slot numbers SN=4 and SN=5 of FIG. 7 explained in the first embodiment, an explanation of the operation will be omitted.

Effect of the Third Embodiment

The wireless communication apparatus and its communication method according to the third embodiment can provide the same effect as described in item (1). The wireless communication apparatus and its communication method according to the third embodiment use the SCO link differing in communication method from that in the pico-net of the first and second embodiments. In this case too, as the MAC layer module 222 outputs to the generation module 230 the slot synchronizing signal, connection information, link method (in this case, SCO link) information, and Bluetooth packet (in this case, HV2 packet) information, the generation module 230 can predict the timing with which the mobile telephone 103 will transmit a Bluetooth packet, that is, the timing with which the slot will be changed to an even-numbered slot. That is, even when Bluetooth packets are transmitted and received periodically as in the SCO link, the timing with which transmission will be performed in the period is predicted and the transmission inhibit signal is made high with the predicted timing, which enables Bluetooth communication and wireless LAN communication to be prevented from interfering with each other. Accordingly, with the wireless communication apparatus and its communication method according to the third embodiment, even if transmission and reception are performed by a different link method, the communication module 210 can perform wireless LAN communication, while suppressing the degradation of the communication performance of Bluetooth communication.

[Modification]

Next, a wireless communication apparatus and its communication method according to a modification of the third embodiment will be explained. The wireless communication apparatus of the modification makes enhanced Synchronous Connection Oriented (eSCO) link connection in a pico-net. That is, the HV2 packets are transmitted in such a manner that three packets are connected in burst form. In this case, too, the same fixed frequency is used in a period during which consecutive HV2 packets are transmitted.

Since the configuration of the wireless communication apparatus and the function of the configuration according to the modification are the same as those of the first embodiment, an explanation of them will be omitted. In addition, the communication module 220 functions as a slave to the mobile telephone 103 as in the first embodiment.

<Data Transmission and Reception in Wireless Communication System (Part 4)>

The operation of transmitting and receiving data in the wireless communication system of the modification will be explained with reference to FIG. 10. FIG. 10 depicts time charts to illustrate wireless LAN communication between the in-car unit 101 and in-car display 102 and Bluetooth communication between the in-car unit 101 and mobile telephone 103. Time is plotted along the horizontal axis. Slot number SN, Bluetooth packet transmission from the mobile telephone 103, Bluetooth packet transmission from the communication module 220, transmission inhibit signal, and data (data frame, Ack) exchanged between the communication module 210 and in-car display 102 in wireless LAN communication are enumerated vertically. Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. For the sake of convenience, suppose slot number SN starts with 2 and a pico-net is formed before slot number SN=0 (not shown). An explanation of the same operations as in the first to third embodiments will be omitted.

<Slot Numbers SN=2 to SN=15>

The mobile telephone 103 transmits a Bluetooth packet to the communication module 220 with the timing of slot number SN=2. As described above, in the modification, the mobile telephone 103 transmits HV2 packets by the eSCO link method. Accordingly, the mobile telephone 103 transmits HV2 packets in burst form at the same fixed frequency during the period of slot numbers SN=2 to SN=4. Therefore, on the basis of the slot synchronizing signal, connection information, and Bluetooth packet (in this case, HV2 packet) information received from the MAC layer module 222, the generation module 230 makes the transmission inhibit signal high during the period from when slot number SN=2 starts until the transfer of Bluetooth packets from the mobile telephone 103 is completed in slot number SN=4 (S1, in FIG. 10, the extension period from slot SN=2 to slot SN=4).

Thereafter, when having received connection information about the completion of the transmission of HV2 packets from the mobile telephone 103 from the MAC layer module 222, the generation module 230 outputs a low transmission inhibit signal (S1)

Next, since the mobile telephone 103 has transmitted Bluetooth packets in the slot numbers SN=2 to SN=4, the generation module 230 predicts that the communication module 220 will transmit a Bluetooth packet in slot number SN=5.

Accordingly, the generation module 230 makes the transmission inhibit signal high 25 μsec before the slot number changes to slot number SN=5. Thereafter, when the slot number has changed to slot number SN=5, the communication module 220 transmits a Bluetooth packet to the mobile telephone 103. The generation module 230 has received link method information from the MAC layer module 222. Therefore, the generation module 230 makes the transmission inhibit signal high until the transmission of Bluetooth packets is completed (S1, in FIG. 10, the extension period shown by slot numbers SN=5 to SN=7).

Thereafter, on the basis of connection information from the MAC layer module 222, the generation module 230 makes the transmission inhibit signal low (S1). Since having recognized that the eSCO link connection is in progress, the generation module 230 makes the transmission inhibit signal low during the period of slot numbers SN=8 and SN=9 adjacent to slot number SN=7 in which the transmission of HV2 packets by the communication module 210 has been completed, that is, in a period of 1.25 msec.

In the modification, too, since frames are transmitted and received in wireless LAN communication (S2), the same transmission control as in the above embodiments is performed in the period during which the transmission inhibit signal is made low.

Since the operations in slot number SN=10 and forward are the same as those in slot number SN=4 and forward in FIG. 8 in the second embodiment, an explanation of them will be omitted.

<Effect of Modification>

The wireless communication apparatus and its communication method according to the modification can provide the same effect as described in item (1). The wireless communication apparatus and its communication method according to the modification use an eSCO link differing in communication method from that in the pico-net of the first to third embodiments. In this case too, the MAC layer module 222 outputs to the generation module 230 the slot synchronizing signal, connection information, link method (in this case, SCO link) information, and Bluetooth packet (in this case, HV2 packet) information, the generation module 230 can predict the timing with which the mobile telephone 103 will transmit a Bluetooth packet, that is, the timing with which the slot will be changed to an even-numbered slot.

Accordingly, with the wireless communication apparatus and its communication method according to the modification, even if transmission and reception are performed by a different link method, the communication module 210 can perform wireless LAN communication, while suppressing the degradation of the communication performance of Bluetooth communication. That is, even by the eSCO link method, the same effect as described in item (1) can be obtained.

Fourth Embodiment

Next, a wireless communication apparatus and its communication method according to a fourth embodiment of the invention will be explained. The wireless communication apparatus of the fourth embodiment is such that the communication module 220 functions as a master to the mobile telephone 103 in the first embodiment. In the fourth embodiment, the communication module 210 and the communication module 220 functioning as a master are provided in the same LSI or in the same unit. That is, in the fourth embodiment, the mobile telephone 103 functions as a slave to the communication module 220. Accordingly, when a pico-net including the communication module 220 and mobile telephone 103 is established, the specific connection process is carried out with the communication module 220 as the master. On the basis of the internal clock of the MAC layer module 222, the mobile telephone 103 synchronizes the MAC layer module 222 with a time slot. With this synchronization, connection information and the slot synchronizing signal held in the master are supplied from the MAC layer module 222 to the generation module 230. As a result, the generation module 230 can generate a transmission inhibit signal.

As described above, since the communication module 210 and the communication module 220 functioning as the master are provided in the same LSI or in the same unit, the generation module 230 can be informed in advance by the MAC layer module 222 whether there is any Bluetooth packet to be transmitted by the communication module 220. Accordingly, if the generation module 230 is informed in advance that there is no Bluetooth packet to be transmitted by the communication module 220, there is no need to make the transmission inhibit signal high with the timing of an odd-numbered slot changing to an even-numbered slot. Hereinafter, in the fourth embodiment, an explanation will be given on the assumption that the generation module 230 cannot be informed in advance as to whether there is any Bluetooth packet to be transmitted by the communication module 220.

Since the configuration of the wireless communication apparatus 200 and the function of the configuration are the same as those of the first to third embodiments, except for what has been described above, an explanation of them will be omitted. Although data transmission and reception using DM1 packets will be explained in the wireless communication apparatus and its communication method of the fourth embodiment, DM3 packets, DM5 packets, or HV2 packets may be used instead of DM1 packets.

<Data Transmission and Reception in Wireless Communication System (Part 5)>

Next, the operation of transmitting and receiving data in the wireless communication system of the fourth embodiment will be explained with reference to FIG. 11. FIG. 11 depicts time charts to illustrate wireless LAN communication between the in-car unit 101 and in-car display 102 and Bluetooth communication between the in-car unit 101 and mobile telephone 103. Time is plotted along the horizontal axis. Slot number SN, Bluetooth packet transmission from the mobile telephone 103, Bluetooth packet transmission from the communication module 220, transmission inhibit signal, and data (data frame, Ack) exchanged between the communication module 210 and in-car display 102 in wireless LAN communication are enumerated vertically. Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. For the sake of convenience, suppose slot number SN starts with 2 and a pico-net is formed before slot number SN=0 (not shown). An explanation of the same operations as in the first to third embodiments will be omitted.

<Slot Numbers SN2 to SN5>

As described above, after a pico-net has been formed, the generation module 230 cannot be informed in advance that there is no Bluetooth packet to be transmitted by the communication module 220. Accordingly, on the basis of the slot synchronizing signal received from the MAC layer module 222, the generation module 230 makes the transmission inhibit signal high during the period from when slot number SN changes from SN=1 (not shown) to SN=2 until 25 µsec after the slot number has changed to SN=2 (S1, in FIG. 11, 25 µsec from the starting point of slot SN=2)

If the generation module 230 can be informed in advance that there is no Bluetooth packet to be transmitted by the communication module 220, the module 230 may make low the transmission inhibit signal to be output to the transmission control module 213 in slot number SN=2.

Thereafter, the occupation time calculation module 231 and generation module 230 carry out the same operations as described in FIG. 7 of the first embodiment in the period of slot numbers SN=2 and SN=3 (SN=2 and SN=3 in FIG. 7).

Then, on the basis of the slot synchronizing signal supplied from the MAC layer module 220, the generation module 230 outputs a high transmission inhibit signal to the transmission control module 213 25 µsec before slot number SN=3 changes to slot number SN=4 (S1).

Then, the communication module 220 transmits a Bluetooth packet with the timing of slot number SN=4. Therefore, on connection information from the MAC layer module 222, the generation module 230 causes the transmission inhibit signal to remain high.

If the generation module 230 has been informed by the MAC layer module 222 before the slot number was changed to slot number SN=4 that there is a Bluetooth packet to be transmitted by the communication module 220, the inhibit signal generation module 230 outputs a high transmission inhibit signal to the transmission control module 213, regardless of connection information from the MAC layer module 222.

Then, after the transmission of a Bluetooth packet by the communication module 220 has been completed, the generation module 230 makes the transmission inhibit signal low.

Next, since the communication module 220 has transmitted a Bluetooth packet in slot number SN=4, the generation module 230 predicts that the mobile telephone 103 will transmit a Bluetooth packet in slot number SN=5.

Accordingly, the generation module 230 makes the transmission inhibit signal high 25 µsec before the slot number changes to slot number SN=5.

Thereafter, the operations explained in FIG. 7 are carried out by the calculation module 231 and transmission control module 213 (transmission decision in slot number SN=4 in FIG. 7). When the slot number has changed to slot number SN=5, the mobile telephone 103 transmits a Bluetooth packet to the communication module 220. Therefore, the generation module 230 makes the transmission inhibit signal high during the period until the Bluetooth packet is transmitted in slot number SN=5.

Effect of the Fourth Embodiment

The wireless communication apparatus and its communication method according to the fourth embodiment can also produce the same effect as described in item (1). Specifically, when the communication module 220 functions as a master to the mobile telephone 103, the MAC layer module 222 informs the generation module 230 of the slot synchronizing signal, connection information, and the presence or absence of a Bluetooth packet to be transmitted, which enables the generation module 230 to generate a transmission inhibit signal at a suitable timing. This makes it possible to avoid the problem of transmitting and receiving data in wireless LAN communication in the middle of Bluetooth communication.

Fifth Embodiment

Next, a wireless communication apparatus and its communication method according to a fifth embodiment of the invention will be explained. FIG. 12 is a block diagram of a wireless communication apparatus 1000 of the fifth embodiment. As shown in FIG. 12, the wireless communication apparatus 1000 included in the in-car unit 101 is such that the communication module 220 functioning as a Bluetooth communication module in FIG. 1 is omitted and a communication module (in FIG. 12, a Time Division Multiple Access (TDMA) wireless communication module 1020) which performs time-division communication is provided. In the wireless communication apparatus 1000, the TDMA wireless communication module 1020 (in this case, assumed to be a mobile unit) and a time-division communication terminal (assumed to be a TDMA base station, not shown) constitute a wireless communication system which performs time-division communication, and the communication module 210 and in-car display 102 constitute a wireless LAN system as in the first to fourth embodiments.

<Configuration of in-Car Unit 101>

The configuration of the in-car unit 101 (wireless communication apparatus 1000) according to the fifth embodiment will be explained, centering on the members differing from those in the first to fourth embodiments. The wireless communication apparatus 1000 includes the TDMA wireless communication module 1020 as described above. The TDMA wireless communication module 1020 includes a physical layer module 1021 and a MAC layer module 1022. Each of the physical layer module 1021 and MAC layer module 1022 has a function for performing time-division communication.

<Physical Layer Module 1021>

The physical layer module 1021 subjects a reception signal (analog signal) supplied from the antenna 240 to A/D converter, thereby obtaining a digital signal. The module 1021 further demodulates the digital signal, obtaining a reception frame. Then, the module 1021 outputs the obtained reception frame to the MAC layer module 1022.

<MAC Layer Module 1022>

The MAC layer module 1022 performs specific access control complying with time-division communication. That is, on the basis of the internal clock of the mobile telephone 103, the MAC layer module 1022 synchronizes the mobile telephone 103 with a time slot. Specifically, the MAC layer module 1022 recognizes each of the timing of transmitting its own data (up-link timing) and the timing of transmitting data by the mobile telephone 103 (down-link timing). Then, the MAC layer module 1022 outputs the transmission timing and connection information on the mobile telephone 103 to the generation module 230.

<Data Transmission and Reception in Wireless Communication System (Part 6)>

Figure 13:
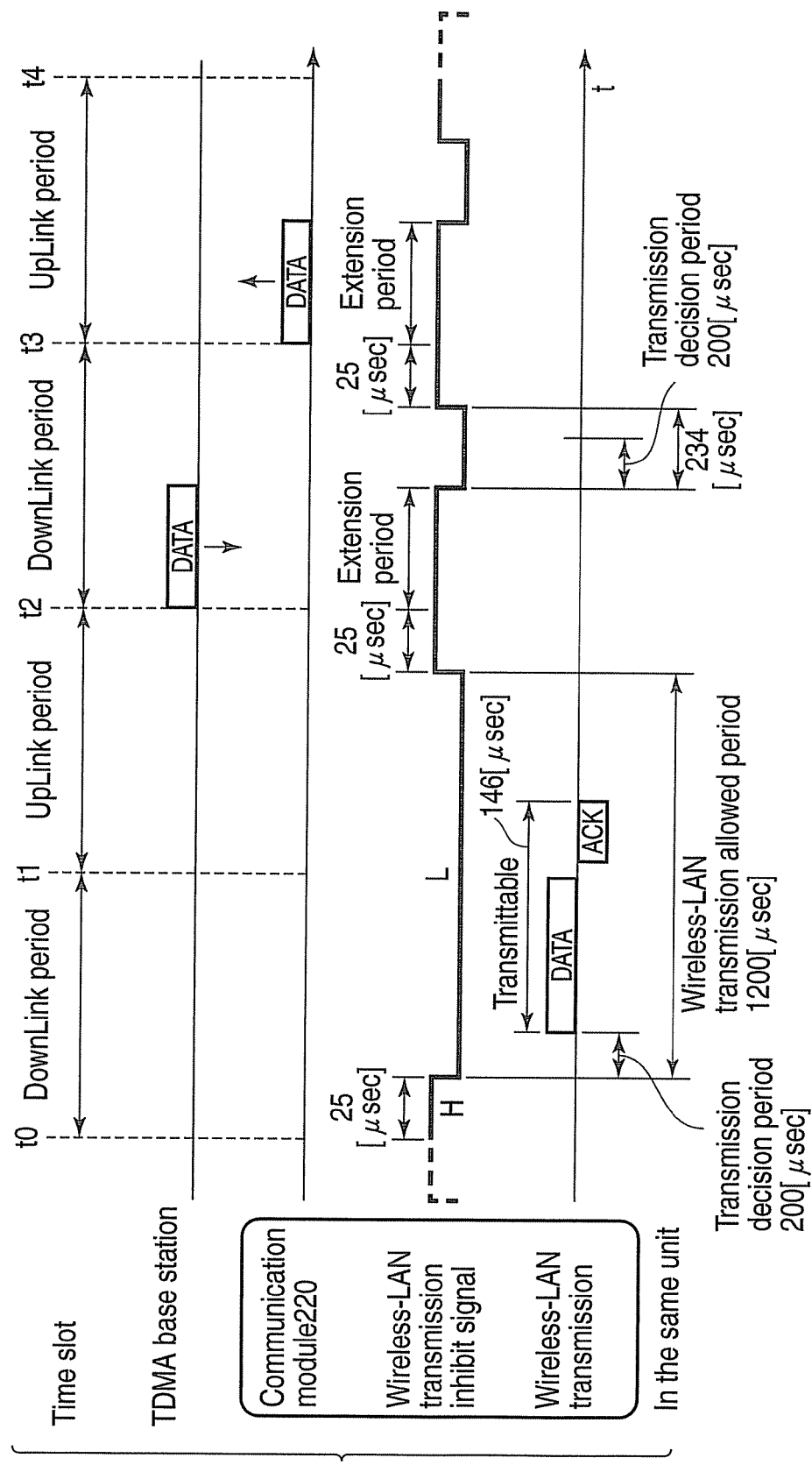
FIG. 13 is a time chart for a wireless communication system according to the fifth embodiment.

Next, the operation of transmitting and receiving data in the wireless communication system of the fifth embodiment will be explained with reference to FIG. 13. FIG. 13 depicts time charts to illustrate wireless LAN communication between the in-car unit 101 and in-car display 102 and communication between the in-car unit 101 and mobile telephone 103 by time-division multiple access. Time is plotted along the horizontal axis. Time slot (Up Link period or Down Link period), data transmission from the mobile telephone 103, data transmission from the communication module 1020 which provides time-division multiple access, transmission inhibit signal, and data (data frame, Ack) exchanged between the communication module 210 and in-car display 102 in wireless LAN communication are enumerated vertically.

Suppose the transmission rate in wireless LAN communication is 54 Mbps and the frame length exchanged between the in-car unit 101 and in-car display 102 is 500 bytes. In this case, it is assumed that the length of a response frame (Ack) is 14 bytes and the response frame is transmitted at a transmission rate of 24 Mbps. Suppose time-division multiple access is established between the communication module 1020 and mobile telephone 103 before time t0 (not shown). The interval between time slots (Down Link periods, Up Link periods) is 625 μsec as in the first to fourth embodiments.

As shown in FIG. 13, the period of time t0 to t1 and the period of time t2 to t3 (Down Link periods) correspond to slot numbers SN=2 and SN=4 of FIG. 7 in the first embodiment, respectively. The period of time t1 to t2 and the period of time t3 to t4 (Up Link periods) correspond to slot numbers SN=3 and SN=4, respectively. In the period of time t2 to t3 (Down Link period), a time-division communication terminal (TDMA base station) transfers data to the communication module 220. In the period of time t3 to t4 (Up Link period), the communication module 220 transfers data to an unshown time-division communication terminal (TDMA base station).

Accordingly, as in FIG. 7, on the basis of the time slot and connection information received from the MAC layer module 1022, the generation module 230 outputs a transmission inhibit signal to the MAC layer module 212. Since the remaining operation is the same as described above, an explanation of it will be omitted.

Effect of the Fifth Embodiment

In the wireless communication apparatus and its communication method according to the fifth embodiment, the functions of the individual members included in the wireless communication apparatus of the first to fourth embodiments may be used without any modification. That is, the communication module mounted on the same LSI or in the same unit as the communication module (communication module 210) which performs wireless LAN communication is not limited to a Bluetooth module. Any suitable module may be used as the communication module to produce the same effect as described in item (1), provided that the module performs time-division communication. The fifth embodiment may be applied not only to the wireless communication apparatus and its communication method according to the first embodiment but also to the wireless communication apparatus and its communication method according to the second and third embodiments.

While in the fifth embodiment the TDMA wireless communication module 1020 is caused to function as a mobile unit and a time-division communication terminal (not shown) is caused to function as a base station, the former may be used as a base station and the latter as a mobile unit. In this case, the same operation as in the fourth embodiment is carried out.

The wireless communication apparatus and its communication method according to the first to fifth embodiments and the individual processing modules constituting the wireless communication apparatus and its communication method according to the modification may be realized by analog or digital circuits. Furthermore, they may be realized by software or the like run by a central processing unit (CPU).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
    a first wireless communication module which constitutes a first wireless communication system which transmits and receives first data to and from a first wireless device by a first communication method;
    a second wireless communication module which constitutes a second wireless communication system which transmits and receives second data to and from a second wireless device in each interval time-divided with determined transmission timing by a second communication method differing from the first communication method; and
    an inhibit period generation module which generates inhibit periods for preventing the first wireless communication module from communicating by use of the first data, on the basis of information on the second communication method held in the second data and/or the transmission timing,
    wherein each of the inhibit periods is generated by the inhibit period generation module each time the transmission timing is reached, and
    the transmission control module stops or delays the transmission of the first data if timing at which the first wireless communication module transmits the first data overlaps the inhibit periods.

2. The apparatus according to claim 1,
wherein each of the inhibit periods is a period which lasts beyond the boundary between the intervals used as the transmission timing, and
if the second data is transferred with the transmission timing, the period lasts until the transfer is completed.

3. The apparatus according to claim 2,
wherein the second wireless device functions as a master which accommodates the second wireless communication module,
the second data includes third data transferred from the second wireless device to the second wireless communication module and fourth data transferred from the second wireless communication module to the second wireless device,
the third data is capable of being transferred by the second wireless device in a (4n+1)-th of the intervals (n is an integer not less than 0),
the fourth data is capable of being transferred by the second wireless communication module in a (4n+2)-th of the intervals (n is an integer not less than 0),
the third and fourth data are not transferred by the second wireless device and the second wireless communication module in a (4n+3)-th and a (4n+4)-th of the intervals,
the second wireless communication module transfers the fourth data in the (4n+2)-th of the intervals when the second wireless device has transferred the third data,
the inhibit period generation module does not generate the inhibit periods in the (4n+3)-th and (4n+4)-th of the intervals,
generates a first inhibit period as one of the inhibit periods in the range from a 4n-th interval to the (4n+1)-th interval, regardless of the transfer of the third data in the (4n+1)-th interval and, when the third data has been transferred in the (4n+1)-th interval, generates a second inhibit period as one of the inhibit periods generated in the range from the (4n+1)-th to (4n+2)-th intervals, and
the transmission control module stops or delays the transmission of the first data if timing at which the first wireless communication module transmits the first data overlaps the first inhibit period or the second inhibit period.

4. The apparatus according to claim 3,
wherein the transmission control module generates the first period when the second wireless communication module has received the third data and, if timing at which the first wireless communication module transmits overlaps the first inhibit period, stops or delays the transmission of the first data, and
generates the second period when the second wireless communication module has transmitted the fourth data in response to the reception of the third data and, if timing at which the first wireless communication module transmits the first data overlaps the second inhibit period, instructs the first wireless communication module to stop or delay the transmission of the first data.

5. The apparatus according to claim 2,
wherein the second wireless device functions as a master which accommodates the second wireless communication module,
third data transferred from the second wireless device to the second wireless communication module and fourth data transferred from the second wireless communication module to the second wireless device are transmitted and received as the second data in the each interval,
the second wireless device transfers the third data with first transmission timing and, when the third data has been transferred, the second wireless communication module transfers the fourth data with second transmission timing,
the inhibit period generation module generates a first inhibit period as one of the inhibit periods with the first transmission timing, regardless of the transfer of the third data, and generates a second inhibit period as one of the inhibit periods generated with the second transmission timing when the third data has been transferred with the first transmission timing, and
the transmission control module stops or delays the transmission of the first data if timing at which the first wireless communication module transmits the first data overlaps the first inhibit period or the second inhibit period.

6. The apparatus according to claim 5,
wherein the transmission control module generates the first period when the second wireless communication module has received the third data and, if timing at which the first wireless communication module transmits the first data overlaps the first inhibit period, stops or delays the transmission of the first data, and
generates the second period when the second wireless communication module has transmitted the fourth data in response to the reception of the third data and, if timing at which the first wireless communication module transmits the first data overlaps the second inhibit period, instructs the first wireless communication module to stop or delay the transmission of the first data.

7. The apparatus according to claim 1,
wherein the second wireless device functions as a master which accommodates the second wireless communication module,
third data transferred from the second wireless device to the second wireless communication module and fourth data transferred from the second wireless communication module to the second wireless device are transmitted and received as the second data in the each interval,
the second wireless device transfers the third data with first transmission timing and, when the third data has been transferred, the second wireless communication module transfers the fourth data with second transmission timing,
the inhibit period generation module generates a first inhibit period as one of the inhibit periods with the first transmission timing, regardless of the transfer of the third data, and generates a second inhibit period as one of the inhibit periods generated with the second transmission timing when the third data has been transferred with the first transmission timing, and
the transmission control module stops or delays the transmission of the first data if timing at which the first wireless communication module transmits the first data overlaps the first inhibit period or the second inhibit period.

8. The apparatus according to claim 7,
wherein the transmission control module generates the first period when the second wireless communication module has received the third data and, if timing at which the first wireless communication module transmits the first data overlaps the first inhibit period, stops or delays the transmission of the first data, and
generates the second period when the second wireless communication module has transmitted the fourth data in response to the reception of the third data and, if timing at which the first wireless communication module transmits the first data overlaps the second inhibit period, instructs the first wireless communication module to stop or delay the transmission of the first data.

9. A wireless communication apparatus comprising:

a first wireless communication module which constitutes a first wireless communication system which transmits and receives first data to and from a first wireless device by a first communication method;

a second wireless communication module which constitutes a second wireless communication system which transmits and receives second data to and from a second wireless device in each interval time-divided with determined transmission timing by a second communication method differing from the first communication method;

an inhibit period generation module which generates inhibit periods for preventing the first wireless communication module from communicating by use of the first data, on the basis of information on the second communication method held in the second data and/or the transmission timing, and an occupation time calculation module which calculates an occupation time required for the transmission and reception of the first data, wherein each of the inhibit periods is generated by the inhibit period generation module each time the transmission timing is reached, a transmission control module which compares the period between the inhibit periods adjacent to one another with the occupation time and, according to the comparison result, instructs the first wireless communication module to stop or delay the transmission of the first data, and the transmission control module stops or delays the transmission of the first data if the occupation time is longer than the period between the inhibit periods adjacent to one another.

* * * * *